United States Patent
Xing et al.

(10) Patent No.: US 9,627,691 B2
(45) Date of Patent: Apr. 18, 2017

(54) METALIZED, THREE-DIMENSIONAL STRUCTURED OXYGEN CATHODE MATERIALS FOR LITHIUM/AIR BATTERIES AND METHOD FOR MAKING AND USING THE SAME

(71) Applicant: ADA TECHNOLOGIES, INC., Littleton, CO (US)

(72) Inventors: Weibing Xing, Littleton, CO (US); Josh Buettner-Garrett, Littleton, CO (US)

(73) Assignee: ADA Technologies, Inc., Littleton, CO (US)

( * ) Notice: Subject to any disclaimer, the term of this patent is extended or adjusted under 35 U.S.C. 154(b) by 79 days.

(21) Appl. No.: 14/175,873

(22) Filed: Feb. 7, 2014

(65) Prior Publication Data

US 2014/0248544 A1 Sep. 4, 2014

Related U.S. Application Data

(60) Provisional application No. 61/762,179, filed on Feb. 7, 2013.

(51) Int. Cl.
| | |
|---|---|
| *H01M 4/02* | (2006.01) |
| *H01M 4/90* | (2006.01) |
| *H01M 12/08* | (2006.01) |
| *H01M 4/38* | (2006.01) |

(52) U.S. Cl.
CPC .......... *H01M 4/9016* (2013.01); *H01M 4/02* (2013.01); *H01M 12/08* (2013.01); *H01M 4/382* (2013.01); *Y02E 60/50* (2013.01); *Y10T 428/298* (2015.01); *Y10T 428/2982* (2015.01)

(58) Field of Classification Search
CPC .............................. H01M 4/02; H01M 4/9016
See application file for complete search history.

(56) References Cited

U.S. PATENT DOCUMENTS

| | | | |
|---|---|---|---|
| 4,310,609 A | 1/1982 | Liang et al. | |
| 4,603,165 A | 7/1986 | McDonald et al. | |
| 5,908,715 A | 6/1999 | Liu et al. | |
| 6,096,453 A | 8/2000 | Grunwald | |
| 6,235,433 B1 | 5/2001 | Amano et al. | |
| 6,268,088 B1 | 7/2001 | Oh et al. | |
| 6,283,812 B1 | 9/2001 | Jin et al. | |
| 6,396,682 B1 | 5/2002 | Kim et al. | |
| 6,503,660 B2 | 1/2003 | Baker et al. | |
| 6,563,694 B2 | 5/2003 | Kim et al. | |
| 6,667,825 B2 | 12/2003 | Lu et al. | |
| 6,726,732 B2 | 4/2004 | Kim et al. | |
| 6,790,425 B1 | 9/2004 | Smalley et al. | |
| 6,828,062 B2 | 12/2004 | Lu et al. | |
| 6,939,453 B2 | 9/2005 | Anderson et al. | |
| 6,991,876 B2 | 1/2006 | Narang et al. | |
| 7,011,760 B2 | 3/2006 | Wang et al. | |
| 7,061,749 B2 | 6/2006 | Liu et al. | |
| 7,147,966 B2 | 12/2006 | Ren et al. | |
| 7,157,588 B2 | 1/2007 | Harmer et al. | |
| 7,238,772 B2 | 7/2007 | Harmer et al. | |
| 7,282,295 B2 | 10/2007 | Visco et al. | |
| 7,283,349 B2 | 10/2007 | Yoshida et al. | |
| 7,297,289 B2 | 11/2007 | Sato et al. | |
| 7,347,954 B2 | 3/2008 | Banno et al. | |
| 7,390,591 B2 | 6/2008 | Visco et al. | |
| 7,411,716 B2 | 8/2008 | Oh et al. | |
| 7,463,478 B2 | 12/2008 | Mitsuda et al. | |
| 7,471,502 B2 | 12/2008 | Sato et al. | |
| 7,505,250 B2 | 3/2009 | Cho et al. | |
| 7,544,445 B2 | 6/2009 | Kinouchi et al. | |
| 7,601,771 B2 | 10/2009 | Schmidt et al. | |
| 7,626,748 B2 | 12/2009 | Radmard et al. | |
| 7,648,406 B2 | 1/2010 | Tai et al. | |
| 7,737,224 B2 | 6/2010 | Willis et al. | |
| 7,790,317 B1* | 9/2010 | Poeppelmeier | H01M 4/34 423/23 |
| 8,236,446 B2 | 8/2012 | Lu et al. | |
| 8,277,691 B2 | 10/2012 | Lu et al. | |
| 8,284,539 B2 | 10/2012 | Lu et al. | |
| 2003/0077515 A1 | 4/2003 | Chen et al. | |
| 2004/0167014 A1 | 8/2004 | Yan et al. | |
| 2005/0042450 A1 | 2/2005 | Sano et al. | |

(Continued)

FOREIGN PATENT DOCUMENTS

| | | |
|---|---|---|
| DE | 19829030 | 10/1999 |
| EP | 1198022 | 4/2002 |
| EP | 1380569 | 1/2004 |
| EP | 1548751 | 6/2005 |
| EP | 1672651 | 6/2006 |
| EP | 2613389 | 7/2013 |
| JP | 2003-234254 | 8/2003 |
| JP | 2008-016769 | 1/2008 |
| WO | WO 02/053808 | 7/2002 |
| WO | WO 02/063073 | 8/2002 |
| WO | WO 03/012896 | 2/2003 |
| WO | WO 2005/038962 | 4/2005 |
| WO | WO 2005/083829 | 9/2005 |
| WO | WO 2005/104269 | 11/2005 |
| WO | WO 2005/116161 | 12/2005 |
| WO | WO 2006/137893 | 12/2006 |
| WO | WO 2007/010039 | 1/2007 |
| WO | WO 2007/010042 | 1/2007 |
| WO | WO 2008/016990 | 2/2008 |

OTHER PUBLICATIONS

Christensen et al., "A Critical Review of Li/Air Batteries," Journal of the Electrochemical Society, 2012, vol. 159(2), pp. R1-R30.

(Continued)

*Primary Examiner* — Edward Cain
(74) *Attorney, Agent, or Firm* — Sheridan Ross P.C.

(57) ABSTRACT

This disclosure relates generally to cathode materials for electrochemical energy cells, more particularly to metal/air electrochemical energy cell cathode materials containing silver vanadium oxide and methods of making and using the same. The metal/air electrochemical energy cell can be a lithium/air electrochemical energy cell. Moreover the silver vanadium oxide can be a catalyst for one or more of oxidation and reduction processes of the electrochemical energy cell.

33 Claims, 11 Drawing Sheets

(56) References Cited

U.S. PATENT DOCUMENTS

| | | | |
|---|---|---|---|
| 2005/0081983 | A1 | 4/2005 | Nakayama et al. |
| 2005/0103706 | A1 | 5/2005 | Bennett et al. |
| 2005/0231891 | A1 | 10/2005 | Harvey |
| 2006/0078790 | A1 | 4/2006 | Nimon et al. |
| 2006/0226396 | A1 | 10/2006 | Majumdar et al. |
| 2006/0257645 | A1 | 11/2006 | Asaka et al. |
| 2007/0153353 | A1 | 7/2007 | Gruner |
| 2007/0201184 | A1 | 8/2007 | Plee et al. |
| 2007/0258192 | A1 | 11/2007 | Schindall et al. |
| 2007/0275284 | A1* | 11/2007 | Merritt .................. A61N 1/375 429/326 |
| 2008/0063585 | A1 | 3/2008 | Smalley et al. |
| 2008/0138700 | A1 | 6/2008 | Horpel et al. |
| 2008/0212261 | A1 | 9/2008 | Ajayan et al. |
| 2010/0021819 | A1 | 1/2010 | Zhamu et al. |
| 2011/0287316 | A1 | 11/2011 | Lu et al. |
| 2012/0053397 | A1* | 3/2012 | Deegan ................. A61F 2/0036 600/30 |

OTHER PUBLICATIONS

Dobley et al., "High Capacity Cathodes for Lithium-Air Batteries," Yardney Technical Products, Inc./Lithion, Inc., 1 page.
Ramasamy, et al., "Discharge characteristics of silver vanadium oxide cathodes," Journal of Applied Electrochemistry, 2006, vol. 36, pp. 487-497.
Sauvage, et al., "Room-Temperature Synthesis Leading to Nanocrystalline Ag2V4O11," J. Am. Chem. Soc., 2010, vol. 132(19), pp. 6778-6782.
Takeuchi et al., "Reduction of Silver Vanadium Oxide in Lithium/Silver Vanadium Oxide Cells," Journal of the Electrochemical Society, Nov. 1988, vol. 135(11), pp. 2691-2694.
Wikipedia, "Lithium-air battery," retrieved from http://en.wikipedia.org/wiki/Lithium%E2%80%93air_battery, retrieved on May 26, 2015, 11 pages.
Xing et al., "High Performance LiNi0.5Mn1.5O4 Spinel Li-ion Battery Cathode Development," The Electrochemical Society, ECS Transations, 2013, 53(30), pp. 111-119, 9 pages.
Zhang et al., "Preparation, Characterization and Electrochemical Catalytic Properties of Hallandite Ag2Mn8O16 for Li-Air Batteries," Journal of the Electrochemical Society, 2012, vol. 159(3), pp. A310-A314.
Zhong, "Lithium-Air Batteries: An Overview," Submitted as coursework for PH240, Stanford University, Dec. 3, 2011, 4 pages.
"File: Types of Carbon Nanotubes.png", Wikipedia website, as early as May 2006, available at http://en.wikipedia.org/wiki/File:Types_of_Carbon_Nanotubes.png, printed on Jun. 26, 2009, pp. 1-5.
"File: Carbon nanorim armchair povray.PNG", Wikimedia Commons Website, as early as Nov. 27, 2007, available at http://commons.wikimedia.org/wiki/File:Carbon_nanorim_armchair_povray.PNG, printed on Jun. 18, 2009, pp. 1-5.
"File: Carbon nanotube armchair povray.PNG", Wikimedia Commons Website, as early as Nov. 27, 2007, available at http://commons.wikimedia.org/wiki/File:Carbon_nanotube_armchair_povray.PNG, printed on Jun. 18, 2009, pp. 1-5.
"High-power lithium-ion (BU5A)", BatteryUniversity.com Website, as early as Mar. 16, 2006, available at http://batteryuniversity.com/partone-5A.htm, printed on Apr. 28, 2009, pp. 1-7.
"Ionic Liquids", description on Solvan-innovation website, as early as Feb. 1, 2001, http://web.archive.org/web/20010203174200/www.solvent-innovation.com/Englisch/index2.htm, pp. 1-2, printed on Jun. 19, 2009.
Ionic Liquids Product Range, EMD, Apr. 25, 2006, 12 pages found © http://www.emdchemicals.com/showBrochure?id=200904.3312.
"Nanobatteries", Wikipedia website, as early as Dec. 26, 2007, available at http://en.wikipedia.org/wikilNanobatteries, pp. 1-2, printed on Jun. 19, 2009.
Buettner-Garrett et al. "Nanomaterial Technologies for Long-Life Li-ion Batteries. Draft Final Report" ADA Technologies, Inc., Jan. 3, 2011, 31 pages.

Buettner-Garrett et al. "Multi Functional High Energy, High Power Lithium—Polymer Batteries for MAVs." ADA Technologies, Inc. Jan. 14, 2011, 32 pages.
Burke, "Ultracapicitors: why, how, and where is the technology", Journal of Power Sources, 2000, vol. 91, pp. 37-50.
Conway, "Transition from 'Supercapacitor' to 'Battery' Behavior in Electrochemical Energy Storage", J. Electrochem Soc., Jun. 1991, vol. 138, No. 6, pp. 1539-1548.
Conway, et al., "Double-layer and pseudocapacitance types of electrochemical capasitors and their applications to the development of hybrid devices", J Solid State Electrochem, vol. 7, 2003, pp. 637-644.
Cottineau, et al., "Nanostructured transition metal oxides for aqueous hybrid electrochemical supercapacitors", Appl. Phys. A, 2006, vol. 82, pp. 599-606.
Covalent Associates, Inc. home page, as early as Sep. 14, 2000, available at www.covalentassociates.com, pp. 1-2, printed on Jun. 19, 2009.
Croce, et al., "Sythesis and Characterization of Highly Conducting Gel Electrolytes", Electrochimica Acta, 1994, vol. 39, No. 14, pp. 2187-2194.
Duong, "2002 Annual Progress Report for Energy Storage Research and Development, FreedomCAR & Vehicle Technologies Program", Energy Storage Research & Development, U.S. DOE, May 2003, pp. 1-178.
Freemantle, "Designer Liquids in Polymer Systems: Versataile and advantageous, ionic liquids are beginning to create waves in polymer science", Chemical and Engineering News, May 3, 2004, vol. 82, No. 18, pp. 26-29, printed Jan. 26, 2009.
Herring, et al., "A Novel Method for the Templated Synthesis of Homogeneous Samples of Hollow Carbon Nanospheres from Cellulose Chars", Journal of the American Chemical Society, 2003, vol. 125, No. 33, pp. 9916-9917.
Jiang, et al., "Electrochemical supercapicitor material based on manganese oxide: preparation and characterization", Electrochimica Acta, 2002, vol. 47, pp. 2381-2386.
Kalhammer, et al., Status and Prospects for Zero Emissions Vehicle Technology: Report of the ARB Independent Expert Panel 2007, Prepared for the State of California Air Resources Board, Sacramento, California, Apr. 13, 2007, available at http://www.arb.ca.gov/msprog/zevprog/zevreview/zev_panel_report.pdf, 207 pages.
Kim et al., "Pseudocapacitive Properties of Electrochemically Prepared Vanadium Oxide on Carbon Nanotube Film Substrate," Journal of Electrochemistry Society, Jun. 2006, vol. 153, No. 8, pp. A1451-A1458.
Kim, et al., "Synthesis and Electrochemical Characterization of Vanadium Oxide on Carbon Nanotube Film Substrate for Pseudocapacitor Applications", Journal of the Electrochemical Society, 2006, vol. 153, No. 6, pp. A989-A996.
Kubota, et al., "Ionically conductive polymer gel electrolytes prepared from vinyl acetate and methyl methacrylate for electric double layer capacitor", Journal of Applied Polymer Science, 2000, vol. 76, pp. 12-18.
Lee, et al., "Ideal Stapercapacitor Behavior of Amorphous V2O5 • nH2O in Potassium Chloride (KCl) Aqueous Solution", Journal of Solid State Chemistry, 1999, vol. 148, pp. 81-84.
Lewandowski, et al., "Carbon-ionic liquid double-layer capacitors", Journal of Physics and Chemistry of Solids, Mar. 2004, vol. 65, Nos. 2-3, pp. 281-286.
Lu, et al., "High Performance Electrochemical Capacitors from Aligned Carbon Nanotube Electrodes and Ionic Liquid Electrolytes", Journal of Power Sources, Apr. 15, 2009, vol. 189, No. 2, pp. 1270-1277.
Lu, et al., "Ionic Liquid-Incorporated Gel Polymer Electrolytes for Ultracapacitors" submitted to 209th Electrochemical Society Meeting held May 7-12, 2006 in Denver, CO (Abstract), 2 pages.
Lu, et al., "Ionic Liquid-Incorporated Gel Polymer Electrolytes for Ultracapacitors", ECS Transactions, 2007, vol. 2, No. 28, pp. 15-26.
Lu, et al., "Ionic Liquid-Incorporated Gel Polymer Electrolytes for Ultracapacitors", Presented to the 209th Electrochemical Society Meeting held May 7-12, 2006, Denver, CO, pp. 1-23 (PowerPoint Presentation).

(56) References Cited

OTHER PUBLICATIONS

Lu, et al., "Superior Capacitive Performance of Aligned Carbon Nanotubes in Ionic Liquids", Manuscript submitted to ECS Transactions for consideration of publication, Jun. 15, 2007, pp. 1-5.

LU, et al., "Superior Capacitive Performance of Aligned Carbon Nanotubes in Ionic Liquids", The 211th ECS Meeting, Chicago, Illinois, May 6-11, 2007, abstract only, p. 1.

Lu, et al., "Ultra-efficient Supercapacitors from Aligned Carbon Nanotubes and Ionic Liquids", Manuscript submitted to Science for consideration of publication , Jun. 13, 2007, pp. 1-31.

McEwen, et al., "EMIPF6 Based Nonaqueous Electrolytes for Electrochemical Capacitors", Electrochemical Society Proceedings, 1997, vol. 96-25, pp. 313-324.

Niu, et al., "High power electrochemical capacitors based on carbon nanotube electrodes", Appl. Phys. Lett., Mar. 17, 1997, vol. 70, No. 11, pp. 1480-1482.

Osaka, et al., "An Electrochemical Double Layer Capacitor Using an Activated Carbon Electrode with Gel Electrolyte Binder", Journal of the Electrochemical Society, 1999, vol. 146, No. 5, pp. 1724-1729.

Perebeinos et al., "Electron-Phonon Interaction and Transport in Semiconducting Carbon Nanotubes", Physical Review Letters— The American Physical Society, Mar. 4, 2005, vol. 94, pp. 086802-1-086802-4.

Portet, et al., "High power density electrodes for Carbon supercapacitor applications", Electrochimica Acta, vol. 50, 2005, pp. 4174-4181.

Slane, et al., "Composite gel electrolyte for rechargeable lithium batteries", Journal of Power Sources, 1995, vol. 55, pp. 7-10.

Solvant-Innovation Home Page, as early as Feb. 1, 2001, available at http://web.archive.org/web/20010203174200/www.solvent-innovation.com/Englisch/index2.htm, pp. 1-2, printed on Jun. 19, 2009.

Song et al., "Review of Gel-Type Polymer Electrolytes for Lithium-Ion Batteries", J. Power Sources, 77, 1999, pp. 183-197.

Srinivasan, et al., "A Model-based Comparison of Various Li-ion Chemistries", Prepared for Berkeley Electrochemical Research Council, as early as May 1, 2006, available at http://berc.lbl.gov/venkat/Ragone-construction.pps, pp. 1-17.

Sung, et al., "Preparation and Characterization of Poly(vinyl chloride-co-vinyl acetate)-Based Gel Electrolytes for Li-Ion Batteries", Journal of the Electrochemical Society, Apr. 1988, vol. 145, No. 4, pp. 1207-1211.

Tarascon et al., "Performance of Bellcore's Plastic Rechargeable Li-Ion Batteries", Solid State Ionics, 86-88 (1996) 49-54.

Watanabe, et al., "High Lithium Ionic Conductivity of Polymeric Solid Electrolytes", Makromol. Chem. Rapid. Commun., 1981, vol. 2, pp. 741-744.

Huang et al., "Plasma Etching for Purification and Controlled Opening of Aligned Carbon Nanotubes," J. Phys. Chem. B, 2002, vol. 106(14), pp. 3543-3545.

Pusfiparaj et al., "Flexible energy storage devices based on nanocomposite paper," PNAS, Aug. 21, 2007, vol. 104(34), pp. 13574-13577.

Tsai et al., "Bias-enhanced nucleation and growth of the aligned carbon nanotubes with open ends under microwave plasma synthesis," Applied Physics Letters, Jun. 1999, vol. 74(23), pp. 3462-3464.

Signorelli et al. "Nanotube Enhanced Ultracapacitors," Dec. 6-8, 2004, 13 pages.

* cited by examiner

METALIZED, THREE-DIMENSIONAL STRUCTURED OXYGEN CATHODE MATERIALS FOR LITHIUM/AIR BATTERIES AND METHOD FOR MAKING AND USING THE SAME

CROSS REFERENCE TO RELATED APPLICATIONS

The present application claims the benefits of U.S. Provisional Application Ser. Nos. 61/762,179, filed Feb. 7, 2013, entitled "In-Situ Metallized and 3-D Structured Oxygen Cathodes for Metal-Air Batteries", which is incorporated herein by this reference in its entirety.

GOVERNMENT LICENSE RIGHTS

This invention was made with government support under (P9634-12) awarded by the Department of Energy SBIR. The government has certain rights in the invention.

FIELD OF DISCLOSURE

This disclosure relates generally to electrode composite materials for electrochemical energy cells and more particularly to catalytic electrode composite materials for metal/air electrochemical energy cells and methods of making and using the same.

BACKGROUND OF DISCLOSURE

Electrochemical energy cells in general and metal/air or lithium/air electrochemical energy cells in particular are of interest for their theoretically large energy density and specific energy. Moreover, metal/air or lithium/air electrochemical cells have theoretically large specific capacity and energy density.

These theoretical values have yet to be achieved. A need exists for better management of one or both of the anodic and cathodic reactions. Better management of the anodic and/or cathodic reactions is expected to improve electrochemical discharge and recharge of the electrodes and electrolytic transport of electrochemical reactants to and from the electrodes.

SUMMARY OF DISCLOSURE

These and other needs are met by the following disclosure.

In accordance with some embodiments, the present disclosure is to an electrode composite material for an electrochemical energy storage device. The electrode composite material can be in form of $M_xA_yO_z$. The x, y, and z are typically real positive numbers. Generally, the M can be a first metal. The A can generally be a second metal other than the first metal M and O can be oxygen. Furthermore, A can be one or more second metals other than the first metal M. The metal/air electrochemical energy storage device can be a lithium/air battery. Moreover, the $M_xA_yO_z$ can be a catalyst for reducing molecular oxygen. In some configurations, the $M_xA_yO_z$ can be a catalyst for the oxidation of the reduced oxygen during the recharging of the electrochemical energy storage device.

In accordance with some embodiments, the present disclosure is to a method of using a metal/air electrochemical energy storage device electrode. The method can include discharging electrons from an electrode comprising a current collector having an electrode composite material applied to one or more surfaces of the current collector. Moreover, the metal/air electrochemical energy storage device electrode can include a lithium-containing electrolytic salt. The method can further include, contacting the reduced molecular oxygen with the lithium of the lithium-containing electrolytic salt to form $Li_\alpha O_\beta$. The method can include, applying, after the discharging of the electrons, a charging current to the electrode. The charging current can oxidize the $Li_xO_y$, to form molecular oxygen and lithium cations. Moreover, the method can optionally include discharging the electrons from the electrode, reducing at least some, but not most, of the first metal M to a zero-valent, zero-charge metal.

The electrode composite material can reduce the molecular $O_2$ to one or more of $O^{2-}$, $O_2^-$, $O_2^{2-}$, $O_3^-$, and $O_3^{2-}$ (hereinafter an oxygen reduction reaction). Typically, the $M_xA_yO_z$ can reduce the molecular $O_2$ to one or more of $O^{2-}$, $O_2^-$, $O_2^{2-}$, $O_3^-$, and $O_3^{2-}$. Generally, the $M_xA_yO_z$ can have a shape generally resembling a cylindrical rod. The cylindrical rod commonly has a rod length from about 10 to about 200 nm. Furthermore, the cylindrical rod commonly has a rod diameter from about 10 to about 20 nm. Moreover, the $M_xA_yO_z$ can be in the form of particulates. The particulates can have an average particle size ranging from about 1 to about 100 μm.

Typically, the first metal M have an atomic number of one of 21-32, 39-42, 44-49, 64, 65, 74-81, or combinations thereof. More typically, the first metal M can be an $M^+$ cation selected from the group consisting essentially of ruthenium, cobalt, rhodium, iridium, nickel, palladium, platinum, copper, silver, gold, and combinations thereof. Furthermore, the first metal can be $Cu^{2+}$.

Commonly, the second metal A can be an element selected from the group consisting essentially of the elements contained in Groups 3-7, Groups 8-12 of the periodic table of elements and Re. More commonly, the second metal A can be vanadium. Generally the second metal, A is a metal other than manganese. Moreover, the second metal A can be vanadium and one or more of scandium, titanium, chromium, iron, cobalt, nickel and copper; that is, one or more of scandium, titanium, chromium, manganese, iron, cobalt, nickel and copper can be dopants of the second metal A in the $M_xA_yO_z$. When the first metal M is a metal other than silver, A can be manganese.

Furthermore, at least some of the oxygen in the $M_xA_yO_z$ can be replaced with fluoride.

The electrode composite material can further include a conductive carbonaceous material and a polymeric binder. Moreover, the $M_xA_yO_z$ and conductive carbonaceous material can be homogeneously dispersed throughout the polymeric binder.

The conductive carbonaceous material (e.g., high surface area conductive carbon) can be one of carbon black, activated carbon, graphene sheets, single-walled carbon nanotubes, multi-walled carbon nanotubes, conductive graphite, carbon fibers and mixtures thereof. Moreover, the conductive carbonaceous material can have one or both of a surface area from about 25 to about 2,000 m²/g and a pore volume from about 0.1 to about 10 m³/g.

The polymeric binder can be one or more of one or more of a poly vinylidene fluoride homo-polymer, a poly vinylidene fluoride co-polymer, hexafluoropropylene, a poly vinylidene fluoride-co-hexafluoropropylene, poly(tetrafluoroethylene), styrene-butadiene rubber/sodium carboxyl methyl Cellulose, a modified styrene-butadiene copolymer, and a modified styrene-butadiene aqueous copolymer;

The electrolyte can be one or more of dimethlsulfoxide, silanes, tri(ethylene glycol)-substituted trimethylsilane, ethylene carbonate, propylene carbonate, butylene carbonate, ethyl propyl carbonate, dimethyl carbonate, diethyl carbonate, ethyl methyl carbonate, N,N-diethylacetamide, γ-butyrolactone, dimethoxyethane, tetra(ethylene)glycol dimethyl ether, glycol ethers, and tetrahydrofuran.

The electrolytic salt can be one of lithium perfluorinated alkyl sulfates, lithium perflourinated alkyl ether sulfates, lithium perfluorinated aryl sulfates, lithium perflourinated aryl ether sulfates, lithium perfluorinated alkyl-sulfonates, lithium trifluoromethan sulfonate, lithium perchlorate, lithium bis(oxalato)borate, lithium tetrachloroaluminate, lithium tetrafluoroborate, lithium alkylated borates, lithium $B(C_2H_5)_3C_6H_{13}$, lithium tosylate, lithium bis(perfluoroalkylsulfonyl)amide, lithium bis(trifluoromethylsulfonyl) amide, lithium hexafluorophosphate, lithium hexafluoroarsenate, lithium bis(pentafluoro ethylsulfonyl)imide, Lithium tris(trifluoromethylsulfonyl)methide, lithium trifluoro tris (pentafluoroethyl) phosphate, lithium hexafluoroisopropoxide, lithium malonate borate, lithium difluoro(oxalato) borate, and mixtures thereof. The $M_xA_yO_z$ can typically be $Ag_2V_4O_{11}$. Moreover, the $M_xA_yO_z$ can consist essentially of $Ag_2V_4O_{11}$. Furthermore, the second metal A can be a metal other than manganese. Moreover, the $M_xA_yO_z$ can comprise a composition other than $Ag_2Mn_8O_{16}$. Non-limiting examples of other $M_xA_yO_z$ compositions are silver vanadium oxyfluoride compounds $Ag_4V_2O_6F_2$ and $Ag_3VO_2F_4$, and nanocrystalline $Ag_2V_4O_{11}$. In some configurations the $Ag_2V_4O_{11}$ can be in form of particles having an acicular (needle-like) morphology, with an aspect ratio of about 5-20.

Furthermore, the $M_xA_yO_z$ can have in some configurations a first metal to second metal ratio from about 1/2 to about 3/1.

In some configurations the $MA_yO_z$ can be in the form of one or more of silver oxides, silver carbonates, silver chromates, silver molybdenum oxides, silver sulfides, silver selenates, silver tellurates, gold oxides, gold sulfides, gold selenides, gold tellurides, platinum oxides, and platinum sulfides. Moreover, $M_xdA_yO_z$ can be silver molybdenumoxide, silver chromate, copper substituted $Ag_2V_4O_{11}$, manganese substituted $Ag_2V_4O_{11}$, cobalt substituted $Ag_2V_4O_{11}$, iron substituted $Ag_2V_4O_{11}$, and nickel substituted $Ag_2V_4O_{11}$.

In some configurations the $M_xA_yO_z$ can be in the form metal compounds e.g. silver bromate that dissolves in electrolytes.

The current collector can be an electrically conductive material. Moreover, the current collector can allow air to pass through the current collector. Generally, the current collector can be a metal screen, nickel foam, gas and diffusion carbon papers, stainless steel, copper, nickel, silver, platinum, rhodium, iridium, gold, graphene, carbon black, carbon nanotubes, activated carbon, or a combination thereof. Non-limiting examples of other suitable current collectors are aluminum grids, nickel meshes, porous nickel foams, titanium meshes, titanium porous foams, stainless steel meshes, and stainless steel porous foams.

The electrochemical energy storage device can further include a regulator element for controlling one or both of oxygen and water vapor. The regulator can regulate the amount of one or both of oxygen and water vapor entering the electrochemical energy storage device.

Typically, the electrode composite material has from about 1 to about 98 wt % $M_xA_yO_z$. More typically, the electrode composite material can have from about 5 to about 90 wt %, even more typically from about 10 to about 75 wt %, yet even more typically from about 15 to about 50 wt %, still yet even more typically from about 20 to about 40 wt %, or yet still even more typically about 30 wt % $M_xA_yO_z$.

Commonly, the electrode composite material has from about 1 to about 40 wt % of the first metal M. More commonly, the electrode composite material has from about 2 to about 25 wt %, even more commonly from about 5 to about 20 wt %, yet even more commonly from about 9 to about 15 wt %, still yet even more commonly from about 10 to about 12 wt %, or yet still even more commonly about 11 wt % the first metal M.

Generally, after at least the first discharging of electrode composite material, at least some of the first metal M is reduced to a zero-valent, zero-charge metal, $M^0$. More generally, after at least the first discharging of electrode composite material, no more than about 1% of the first metal M is reduced a zero-valent, zero-charge metal, $M^0$. Even more generally, after at least the first discharging of electrode composite material, no more than about 5%, even more generally no more than about 15%, yet even more generally no more than about 25%, or yet still more generally no more than about 50% of the first metal M is reduced a zero-valent, zero-charge metal, $M^0$.

Typically, after at least the first discharging of electrode composite material at least most of the first metal M is reduced to a zero-valent, zero-charge metal, $M^0$. More typically, after at least the first discharging of electrode composite material about 60% or more of the first metal M is reduced a zero-valent, zero-charge metal, $M^0$. Even more typically, after at least the first discharging of electrode composite material about 70% or more, even more typically about 80% or more, yet even more typically about 90% or more, still yet even more typically about 55% or more, or yet still more typically about 97% or more of the first metal M is reduced a zero-valent, zero-charge metal, $M^0$.

Commonly, after at least the first discharging of electrode composite material the electrode composite material contains from about 1 to about 25 wt % of the zero-valent, zero-charge metal, $M^0$. More commonly, after at least the first discharging of electrode composite material the electrode composite material contains from about 2 to about 15 wt %, even more commonly from about 5 to about 10 wt %, or yet even more commonly from about 6 to about 7 wt % of the zero-valent, zero-charge metal, $M^0$.

Generally, the electrode composite material is loaded on the current collector at a level of from about 0.1 to about 15 mg/cm$^2$, more generally, at a level of from about 0.2 to about 10 mg/cm$^2$, even more generally at a level of from about 0.5 to about 7.5 mg/cm$^2$, yet even more generally at a level of from about 1 to about 5 mg/cm$^2$, or yet still even more generally at a level of about 2 mg/cm$^2$.

Typically, the zero-valent, zero-charge metal, $M^0$, is at level in the electrode composite material of from about 0.01 to about 1.0 mg/cm$^2$, more typically, the zero-valent, zero-charge metal, $M^0$, at a level of from about 0.02 to about 0.75 mg/cm$^2$, even more typically at a level of from about 0.05 to about 0.50 mg/cm$^2$, yet even more typically at a level of from about 0.1 to about 0.20 mg/cm$^2$, or still yet even more typically at a level of from about 0.12 to about 0.14 mg/cm$^2$.

Commonly, the metal cation level in the electrode composite material is from about 0.01 to about 0.30 mg/cm$^2$, more commonly, from about 0.02 to about 0.20 mg/cm$^2$, even more commonly, from about 0.05 to about 0.15 mg/cm$^2$, even more commonly, yet even more commonly from about 0.08 to about 0.10 mg/cm$^2$, even more commonly, or yet still even more commonly about 0.09 mg/cm$^2$.

The electrode composite material having $M_xA_yO_z$ and a conductive carbonaceous material homogeneously dispersed throughout the polymeric binder can have a catalytic effect typically of about 1.5 or more for the reduction of oxygen compared to an electrode lacking the $M_xA_yO_z$ but having the conductive carbonaceous material homogeneously dispersed throughout the polymeric binder. The catalytic effect for the electrode composite material having $M_xA_yO_z$ and a conductive carbonaceous material homogeneously dispersed throughout the polymeric binder can more typically be about 2.0 or more, even more typically about 2.5 or more, yet even more typically about 3.0 or more, still yet even more typically about 3.5 or more, or yet still even more typically about 4.0 or more for the reduction of oxygen compared to an electrode lacking the $M_xA_yO_z$ but having the conductive carbonaceous material homogeneously dispersed throughout the polymeric binder.

Conductive metals can be in-situ dispersed, on a microscopic scale, in a metal/air (oxygen) cathode matrix and serve both as electrocatalysts for the oxygen reduction reaction (ORR) and/or oxygen evolution reaction (OER) (generation of molecular oxygen through the chemical reaction when the polarity of the cathode is reversed such as during charging of the battery) and as electron conducting media. In-situ metallization is achieved via an ion-exchange process by which the metal oxides are incorporated in the composite cathode. For example, silver vanadium oxide ($Ag_2V_4O_{11}$, SVO) can be mixed with a high surface area conductive carbon black. In the ion exchange process, silver ions are replaced by lithium ions and become metallic. Metallic silver particles then deposit, on a microscopic scale, in the cathode matrix and serve both as electrocatalysts for ORR and/or OER and as an electron conducting media for the composite cathode. The metal oxides can be substantially homogeneously dispersed in the composite cathode and can act as electrocatalysts themselves for ORR and/or OER. The inherent ability of SVO to accommodate up to seven lithium ions per formula (equivalent to 315 mAh/g) can contribute to the overall metal air cell capacity.

The present disclosure can provide a number of advantages depending on the particular configuration. The energy storage devices of the disclosure can provide one or more of a large increase in energy, a higher discharge cell voltage (i.e. decreased discharge overpotential), and/or an improved rate capability. They can have a low cost compared with gold and platinum-based catalysts. Silver, for example, is a much less expensive starting material and is present in low quantities in the SVO material. Partial substitution of silver with lithium or other metals may also be feasible. They have the potential for long cycle life when combined with suitable electrolyte, protected anode, and cell architecture. SVO material can be stable in air in charged and discharged state. The chemical stability of SVO has been proven in commercial, implantable, medical device batteries for over twenty years. Additional improvements to the stability and overpotential of the OER have been demonstrated. The devices can have lower overpotentials, thereby allowing the device to improve roundtrip efficiency of metal air batteries.

These and other advantages will be apparent from the disclosure of the aspects, embodiments, and configurations contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_0$).

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The "microscopic scale" refers to the scale of objects and events smaller than those that can easily be seen by the naked eye, requiring a lens or microscope to see them clearly.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure, nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The accompanying drawings are incorporated into and form a part of the specification to illustrate several examples of the present invention(s). These drawings, together with the description, explain the principles of the invention(s). The drawings simply illustrate preferred and alternative examples of how the invention(s) can be made and used and are not to be construed as limiting the invention(s) to only the illustrated and described examples.

Further features and advantages will become apparent from the following, more detailed, description of the various embodiments of the invention(s), as illustrated by the drawings referenced below.

DETAILED DESCRIPTION OF DISCLOSURE

Figure 1:
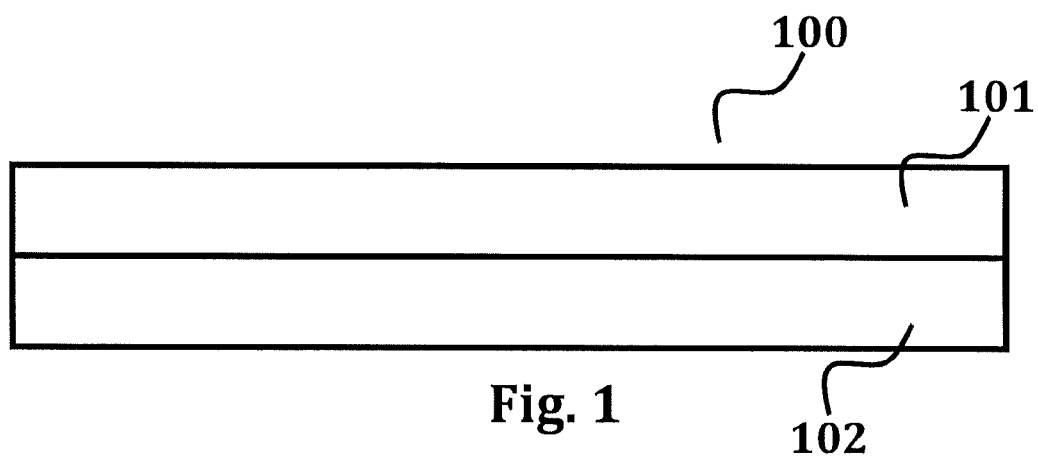
FIG. 1 depicts a cross-section of an electrochemical energy device electrode according to this disclosure.

FIG. 1 depicts an electrochemical energy device electrode 100. The electrochemical energy device electrode 100 can include an electrode composite material 101 coated on a current collector 102. The electrode composite material 101 can be positioned on one or more surfaces of the current collector 102. Typically, at least one surface of the current collector 102 is coated with the electrode composite material 101.

The current collector can be any electrically conductive material. The current collector 102 can allow air to pass through, which those of skill in the art typically refer to as air breathing current collectors. Generally, an air breathing current collector can comprise a metal screen, nickel foam, and gas diffusion carbon papers. Furthermore, the current collector 102 can comprise stainless steel, copper, nickel, silver, platinum, rhodium, iridium, gold, graphene, carbon black, carbon nanotubes, activated carbon, and a combination thereof.

Figure 2:
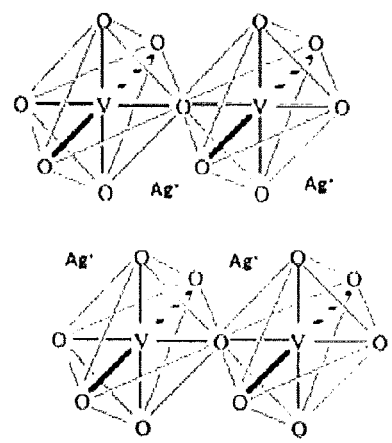
FIG. 2 is representation of an $M_xA_yO_z$ composition according to this disclosure.

The electrode composite material 101 comprises $M_xA_yO_z$, where x, y, and z are real positive numbers, M typically comprises a first metal, A commonly comprises one or more second metals other than first metal M, and O is oxygen (FIG. 2).

The first metal M can have an atomic number of one of 21-32, 39-42, 44-49, 64, 65, 74-81, or combinations thereof. Furthermore, the first metal M can comprise a $M^+$ cation selected from the group consisting of ruthenium, cobalt, rhodium, iridium, nickel, palladium, platinum, copper, silver, gold, and combinations thereof. Furthermore, the first metal M can be $Cu^{2+}$.

In some configurations, the $M_xA_yO_z$ can comprise a metal oxide, $A_yO_z$, and a zero-valent, zero-charge metal, $M^0$.

More typically, the metal oxide, $A_yO_z$, can comprise a metal-containing oxyanion, generally represented generally by the chemical formula $A_xO_y^{n-}$, where n is a real positive number.

The second metal A can be a metal selected from the group consisting of one of a Group 3-13 metal of the periodic table of elements. More generally, the second metal A is a metal selected from the group consisting of Group 5 metal of the periodic table of elements. In some configurations, the $M_xA_yO_z$ comprises $Ag_2V_4O_{11}$. Moreover, the $M_xA_yO_z$ can consist essentially of $Ag_2V_4O_{11}$. Furthermore, A can be a metal other than manganese. Moreover, the $M_xA_yO_z$ can comprise a composition other than $Ag_2Mn_8O_{16}$.

The $M_xA_yO_z$ can contribute to molecular oxygen reduce in the electrochemical energy storage device. That is, the $M_xA_yO_z$ can typically contribute to reduction of molecular $O_2$ to one or more of $O^{2-}$, $O_2^-$, $O_2^{2-}$, $O_3^-$, and $O_3^{2-}$. Moreover, the $M_xA_yO_z$ can be a catalyst in the electrochemical reduction of molecular oxygen.

Generally, the $M_xA_yO_z$ has a shape resembling a cylindrical rod with a rod length from about 10 to about 200 nm and a rod diameter from about 10 to about 20 nm. Moreover, the $M_xA_yO_z$ can be in the form of particulates. The particles can have an average particulate size ranging from about 1 to about 100 µm.

In some embodiments, the $M_xA_yO_z$ comprises vanadium oxide. While not wanting to be limited by theory, one or more dopants can enhance one or both of the catalytic properties of the $M_xA_yO_z$ and $M_xA_yO_z$ improve the stability of the $M_xA_yO_z$ at high electrochemical potentials. The dopants can be selected from the group consisting of chromium, molybdenum, tungsten, manganese, rhenium, iron, rhenium, osmium, cobalt, rhodium, iridium, nickel, palladium, platinum, copper, silver, gold, and combinations thereof. While not wanting to be limited by example, manganese, nickel, copper, and cobalt could be used as dopants to enhance one or both of the catalytic properties of the $M_xA_yO_z$ and to improve the stability of the $M_xA_yO_z$ at high electrochemical potentials.

Figure 3:
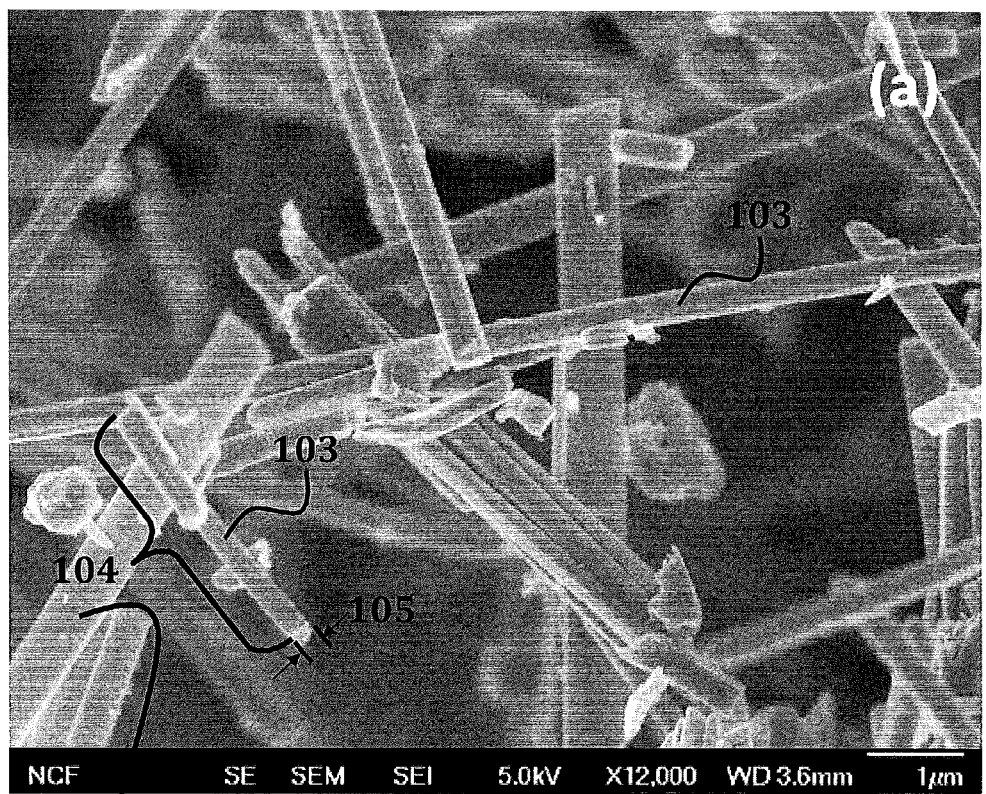
FIG. 3 is a scanning electron microscope image of an $M_xA_yO_z$ composition according to this disclosure.

FIG. 3 is a scanning electron microscopy (SEM) image of a typical $M_xA_yO_z$ (103). In this image, the $M_xA_yO_z$ is silver vanadium oxide. The $M_xA_yO_z$ can generally have a rod-shape and have a rod-length 104 and rod-diameter 105. The rod-diameter 105 is commonly from about 10 to about 20 nm. Generally, the rod-length 104 is from about 10 to about 200 nm. Moreover, the $M_xA_yO_z$ can have an average or primary particle size of about 100 µm.

Acid-assisted room temperature ternary synthesis methods could be used to synthesized $M_xdA_yO_z$. Furthermore, the ternary synthesis method could be used to prepare various silver vanadates and silver vanadium oxyfluorides.

Figure 4:
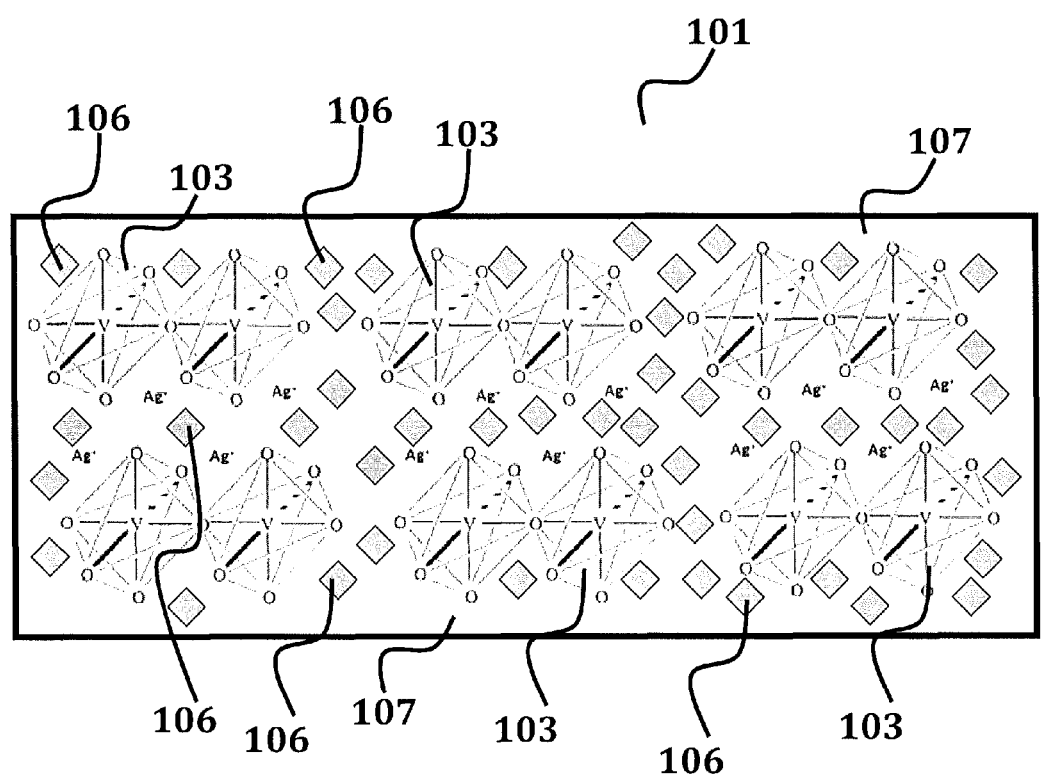
FIG. 4 depicts a cross section of an electrode composition according to this disclosure.

The $M_xA_yO_z$ (depicted as vanadate anions and silver cations, indicated with reference number 103) can be mixed with and/or supported on a conductive material 106 to form the electrode composite material 101 (FIG. 4). The conductive material 106 can be a carbonaceous material, such as, without limitation one or more of carbon black, activated carbon, graphene sheets, single-walled carbon nano-tubes, multi-walled carbon nanotubes, conductive graphite, carbon fibers and mixtures thereof. Further commercial examples of suitable high surface area, conductive carbon blacks, are without limitation AkzoNobel Ketjenblack, Timcal Super P, and conductive graphite and combinations thereof. Super P can be used for stationary storage applications. It is believed that the marginally lower capacity/surface area of the Super P carbon black compared to the more porous carbon blacks, such as Ketjenblack, may one or more of limit side reactions with electrolyte decrease electrode volume, and reduce and/or eliminate parasitic electrolyte mass.

The $M_xA_yO_z$ (103) and conductive material 106 can be combined in any mass-to-mass ratio. Commonly, the mass of $M_xA_yO_z$ (103) to mass of conductive material 106 is from about 1:100 to about 100:1, more commonly from about 1:75 to about 75:1, even more commonly from about 1:50 to about 50:1, yet even more commonly from about 1:25 to about 25:1, still yet even more commonly from about 1:10 to about 10:1, still yet even more commonly from about 1:2 to about 2:1, and yet still even more commonly about 1:1.

The electrode composite material 101 can comprise the $M_xA_yO_z$ (103) substantially homogenously dispersed throughout a polymeric binder 107. Furthermore, the electrode composite material 101 can comprise the $M_xA_yO_z$ (103) and conductive material 106 substantially homogenously dispersed throughout the polymeric binder 107. The polymeric binder 107 can be homo-polymer or co-polymer. The polymeric binder 107 can include polyolefins, polystyrenes, polyvinyls, polyacrylics, polyhalo-olefins, polydienes, polyoxides/esthers/acetals, polysulfides, polyesters/thioesters, polyamides/thioamides, polyurethanes/thiourethanes, polyureas/thioureas, polyimides/thioimides, polyanhydrides/thianhydrides, polycarbonates/thiocarbonates, polyimines, polysiloxanes/silanes, polyphosphazenes, polyketones/thioketones, polysulfones/sulfoxides/sulfonates/sulfoamides, polyphylenes, and mixtures thereof.

In some configurations, the polymeric binder 107 can comprise one or more of a poly vinylidene fluoride homo-polymer, a poly vinylidene fluoride co-polymer, hexafluoropropylene, a poly vinylidene fluoride-co-hexafluoropropylene, poly(tetrafluoroethylene), styrene-butadiene rubber/sodium carboxyl cethyl dellulose, a modified styrene-butadiene copolymer, and a modified styrene-butadiene aqueous copolymer.

Figure 8:
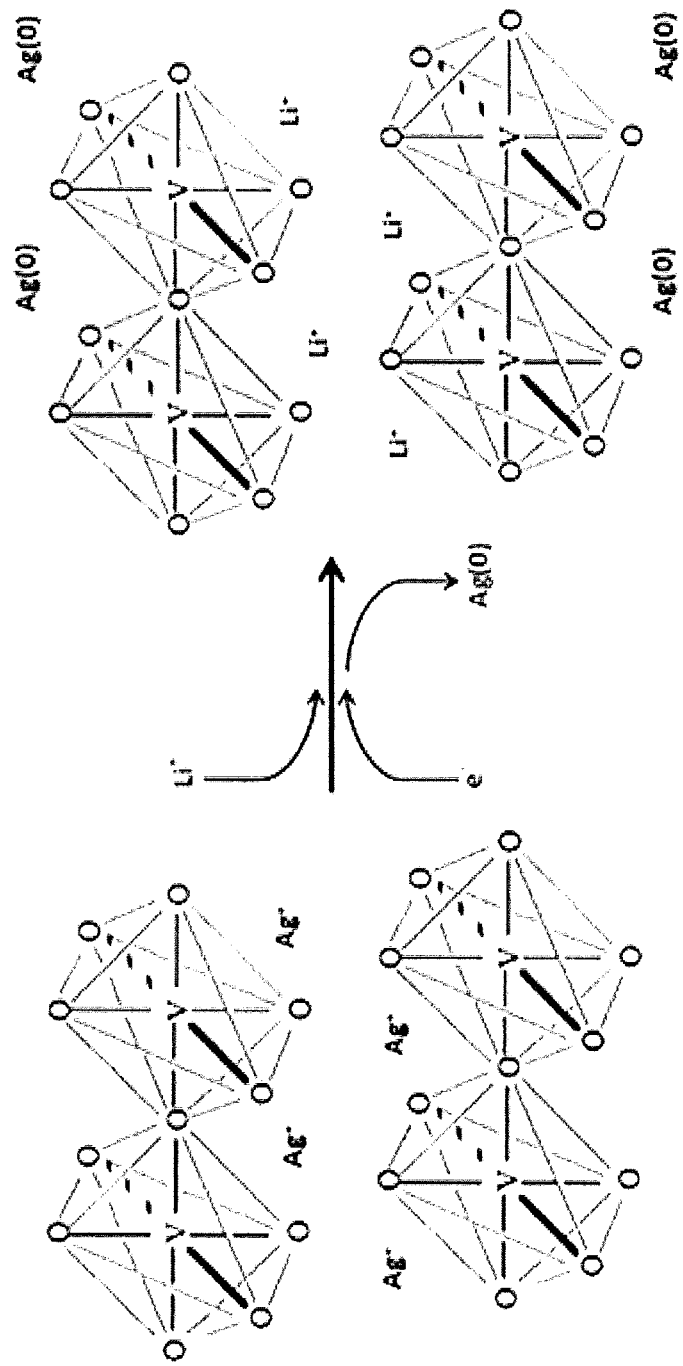
FIG. 8 depicts a scheme of a reaction of $M_xA_yO_z$ according to this disclosure.

After one or more discharges of the electrode composite material 101 one or both, a zero-valent, zero-charge metal, $M^0$, and reduced $A_yO_z$ can be formed (FIG. 8). The zero-valent, zero-charge metal is typically in the form of a metal particulate dispersed throughout the electrode composite material 101.

The zero-valent, zero-charge metal can be any conductive metal in its zero-valent, zero-charge state. Non-limiting examples of suitable conductive zero-valent, zero-charge metals are ruthenium, cobalt, rhodium, boron, cerium, europium, erbium, gadolinium, holmium, lithium, lutetium, neodymium, osmium, rhenium, samarium, terbium, iridium, nickel, palladium, platinum, copper, silver, gold, and mixtures there of. Generally, the zero-valent, zero-charge metal comprises $Ag^0$.

The $M_xA_yO_z$ content of the electrode composite material 101 can range from about 5 to about 60 wt %. Commonly, the porosity of the electrode or electrode composite material comprises from about 10 to about 40%, more commonly from about 20 to 30%.

Some of the benefits of the electrode composite material 101 $M_xA_yO_z$ compared to carbon black alone are one or more of a greater amount of capacity per gram of electrode material, 2800 mAh/g based on carbon and $M_xA_yO_z$ mass, and 2380 mAh/g based on the total electrode material weight including binder compared to a specific capacity of 1320 mAh/g; a decrease of about 80 mV in $\eta_{dis}$; and improved rate capability.

Some of the benefits of the composite electrode 101 over other metal/air cathodes in general and lithium/air battery cathodes in particular are one or more of: low cost compared with gold and platinum-based catalysts, silver is a much less expensive starting material and is present in low quantities in the $M_xA_yO_z$ (103) material, and costs could be further reduced by partial substitution of silver with lithium or other metals; potential for greater cycle life with a more stable electrolyte, such as a silane-based electrolyte and/or an electrolyte having substantial greater stability at potentials of more than 3 volts; and potential for greater cycle life when in electrical communication with a protected anode; potential for greater cycle life when configured with a cell architecture having one or more of a separator having greater electrochemical stability than a Whatman glass fiber separator and a cathodic compartment having better management of the oxygen permeability and/or oxygen flux density; the $M_xA_yO_z$ is stable in air; greater stability of the oxygen evolution reaction may be attainable; greater stability of the overpotential of the oxygen evolution reaction may be attainable; and a charge/discharge efficiency of about 75% with a cyclability of about 50 to about 100 cycles or more with about 80% or more depth of discharge is attainable with a lowering of cathode overpotential and/or more stable electrolyte.

With regard to lithium/air batteries, surface stabilizing electrolyte ingredients and anode treatment procedures can suppress lithium metal dendrite formation during recharging, which could significantly improve cycle life performance. Further, oxygen-breathing membranes, such as Melinex, could minimize electrolyte evaporation and enable long-term cell cycling.

In accordance with some embodiments, the present disclosure is to an electrode composite material 101 for an electrochemical energy storage device. The electrode composite material commonly comprising $M_xA_yO_z$ (103), an optional zero-valent, zero-charge metal, a conductive carbonaceous material 106, and a polymeric binder 107. The electrochemical energy storage device is typically a lithium/air battery, more typically about a 1 MW or greater lithium/air battery.

The electrode composite material 101 can function as an anodic and a cathodic composite material. When the electrochemical energy storage device is discharging electrical energy, the electrode composite material 101 functions as a cathodic composite material (an electron donating material) and, when the electrochemical energy storage device is being recharged, the electrode composite material 101 functions as an anodic composite material (an electron accepting material).

The electrode composite material usually comprises the $M_xA_yO_z$ (103) and conductive carbonaceous material 106 substantially homogeneously dispersed throughout the polymeric binder 107.

In accordance with some embodiments, the present disclosure is to an electrode for an electrochemical energy storage device. The electrode can have a current collector 102, an electrode composite material 101 containing a means for electrochemically reducing molecular oxygen, a conductive carbonaceous material 106, and a polymeric binder 107. The electrode composite material 101 is typically positioned on one or more surfaces of the current collector 102. Furthermore, the means for reducing oxygen, and conductive carbonaceous material 106 are commonly homogeneously dispersed throughout the polymeric binder 107. Typically, the electrochemical energy storage device comprises a lithium/air battery.

When the electrochemical energy storage device is discharging electrical energy, the electrode can be a cathode (a supplier of electrons). Furthermore, when the electrochemical energy storage device is being recharged, the electrode can be an anode (an acceptor of electrons).

Typically, the means for reducing oxygen can comprise one or more of $M_xA_yO_z$, $A_yO_z$ and $A_yO_z^{n-}$, where n is a real positive number. The one or more of $M_xA_yO_z$, $A_yO_z$ and $A_yO_z^{n-}$ can be in one or both of oxidized and reduced forms, respectively. Moreover, the x values for the oxidized and reduced forms of the one or more of $M_xA_yO_z$, $A_yO_z$ and $A_yO_z^{n-}$ can differ. Similarly, they values for the oxidized and reduced forms of the one or more of $M_xA_yO_z$, $A_yO_z$ and $A_yO_z^{n-}$ can differ. Typically, the n value of reduced form of the oxyanion, $A_xO_y^{n-}$, is greater than the oxidized form of the $A_xO_y^{n-}$. More typically, the one or more of $M_xA_yO_z$, $A_yO_z$ and $A_yO_z^{n-}$ can contribute to the reduction of molecular oxygen, $O_2$, to at least one of $O^{2-}$, $O_2^-$, $O_2^{2-}$, $O_3^-$, and $O_3^{2-}$. Furthermore, the means for reducing oxygen can comprise the electrons and/or electrical energy being supplied by the electrode during the discharging of the electrochemical energy storage device. Moreover, the means for reducing oxygen can comprise, the optional zero-valent, zero-charge metal.

Furthermore, the electrode can comprise a recyclable chemical material for charging and discharging of the electrode. The recyclable chemical material can comprise $Li_xO_y$, where x and y are real, positive numbers. Generally, x can have a value of from about 1 to about 3 and y can have a value from about 1 to about 3. More generally, x can have a value of about 2 and y can have a value of about 1.

In accordance with some embodiments, the present disclosure is to a method of using an electrode 100 having a current collector 102 and an electrode composite material 101 applied to one or more surfaces of the current collector 102. The electrode composite material 101 can comprise a non-carbonaceous electrically conductive material having $M_xA_yO_z$ (103) and a conductive carbonaceous material 106, and a polymeric binder 107. Moreover, the metal $M_xA_yO_z$ (103), and conductive carbonaceous material 106 are generally homogeneously dispersed throughout the polymeric binder 107.

Typically, the method includes discharging electrons from the electrode 100. With the discharging of the electrons from the electrode 100, at least some of the $M_xA_yO_z$ and of the electrons discharged by the electrode 100 reduce molecular oxygen. The molecular oxygen, $O_2$, is typically reduced to one or more of $O^{2-}$, $O_2^-$, $O_2^{2-}$, $O_3^-$, and $O_3^{2-}$. Moreover, the reduction of molecular oxygen can form $Li_xO_y$, where x and y are real, positive numbers. Commonly, the $Li_xO_y$ comprises $Li_{1-33}O_{1-3}$. More commonly, the $Li_xO_y$ comprises $Li_2O$.

Furthermore, the method can include applying, after discharging of the electrons, a charging current to the electrode 100. The charging current can oxidize the $Li_xO_y$, formed during discharging of electrons from the electrode 100, to form molecular oxygen and lithium cations. While not wanting to be limited by theory, it is believed that $M_xA_yO_z$ (103) can be a catalyst for the oxidation of $Li_xO_y$.

Figure 9:
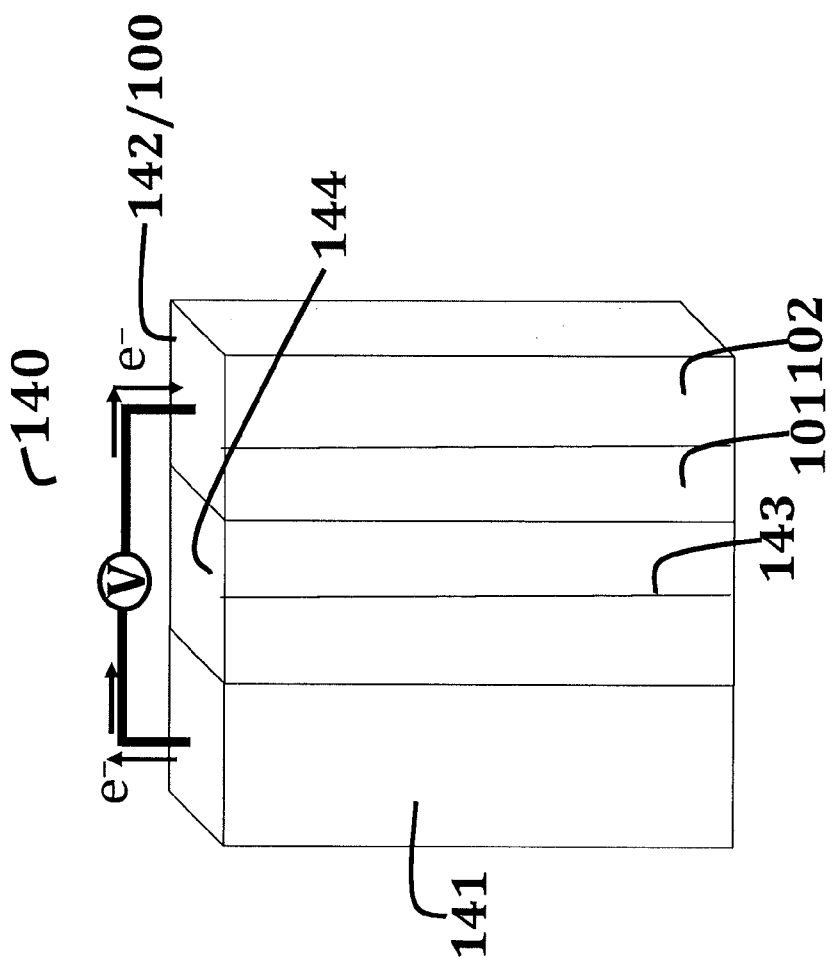
FIG. 9 depicts an electrochemical device according to this disclosure.
Figure 10:
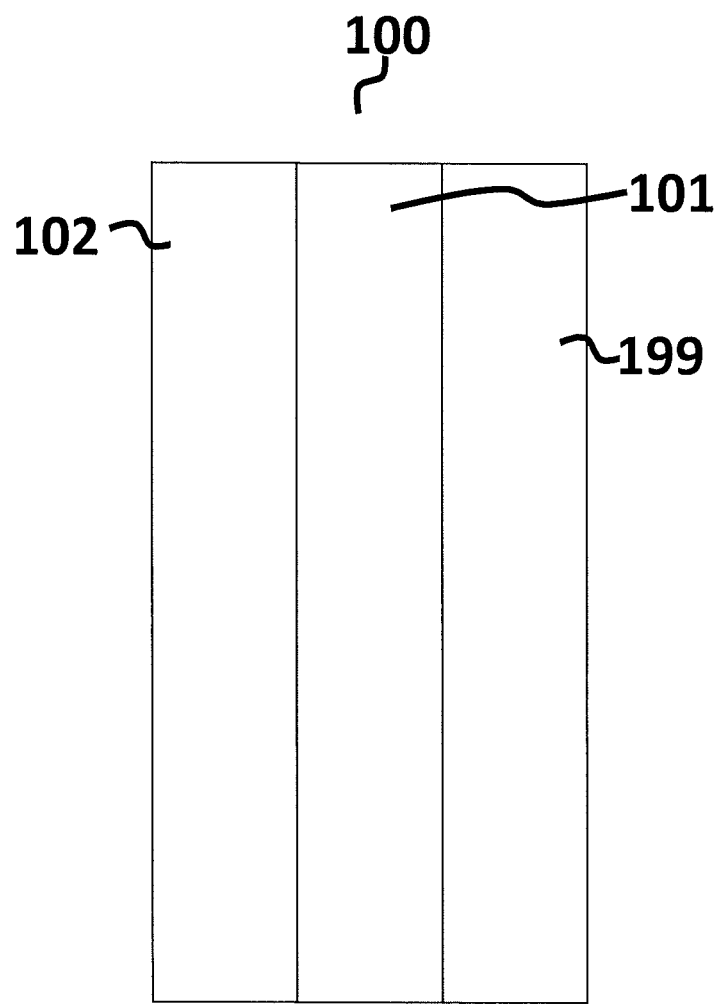
FIG. 10 depicts a cross-section of another electrochemical energy device electrode according to this disclosure.

In accordance with some embodiments, the present disclosure is to an electrochemical energy storage device 140 FIG. 9. The electrochemical energy storage device can include: a metallic anode 141; a cathode 142; and a separator 143 in electrical contact with an electrolyte 144 and positioned between the anode and cathode. The anode and cathode are typically positioned in the electrolyte. The electrochemical energy storage device can comprise a metal/air battery, with a lithium/air battery having a metallic lithium anode being a non-limiting example.

The cathode commonly has a current collector 102 with an electrode composite material 101 applied to one or more surfaces of the current collector. Moreover, the electrode composite material 101 can include $M_xA_yO_z$ (103) (not depicted), an optional zero-valent, zero-charge metal, a conductive carbonaceous material 106, and a polymeric binder 107 with the $M_xA_yO_z$ (103), optional zero-valent, zero-charge metal, and conductive carbonaceous material 106 generally homogeneously dispersed throughout the polymeric binder 107.

The $M_xA_yO_z$ (103) can comprise vanadium. The optional zero-valent, zero-charge metal can be silver, $Ag^0$.

The electrochemical energy storage device can further include $Li_xO_y$, where x and y are real, positive numbers. Commonly, x can range in value from about 1 to about 3, and y can range in value from about 1 to about 3. More commonly, x has a value of about 2 and y has a value of about 1.

The electrochemical energy storage device can further include a regulator element (not depicted) for controlling one or both of an oxygen and water vapor. The regulator can regulate the amount of one or both of oxygen and water vapor entering the electrochemical energy storage device.

In accordance with some embodiments, the present disclosure is to a method of using an electrochemical energy storage device. The method can include: discharging electrons from a cathode. The cathode can include a current collector 102 having an electrode composite material 101 applied to one or more surfaces of the current collector 102. Furthermore, the electrode composite material 101 can contain: $M_xA_yO_z$ (103), a conductive carbonaceous material 106, and a polymeric binder 107. Furthermore, $M_xA_yO_z$ (103) and conductive carbonaceous material 106 are substantially homogeneously dispersed throughout the polymeric binder 107.

With some of the discharged electrons, at least some molecular oxygen is contacted with $M_xA_yO_z$ and the discharged electrons to form a reduced form of oxygen. Typically, the reduced form oxygen can be one of $O^{2-}$, $O_2^-$, $O_2^{2-}$, $O_3^-$, and $O_3^{2-}$. While not wanting to be limited by theory, it is believed that the $M_xA_yO_z$ is a catalyst in the electrochemically reduction of molecular oxygen.

Generally, the method includes contacting lithium cations with the catalytically reduced molecular oxygen to form $Li_xO_y$, where x and y are real, positive numbers. More generally, $Li_xO_y$ is in the form of $Li_{1-3}O_{1-3}$. Even more generally, $Li_xO_y$ is in the form of $Li_2O$.

Furthermore, the method can include, flowing electrons, through an electrical circuit interconnected to the electrochemical energy storage device, from a metallic lithium anode to the cathode for the discharging of the electrons from the cathode and flowing lithium cations, from the lithium anode to the cathode and through an electrolyte in electrical contact with the lithium anode and cathode.

The method can include, passing the lithium cations through a separator. The separator can be positioned between the anode and cathode. Furthermore, transporting the lithium through an electrolyte in electrical contact with the anode, separator, and cathode can be included in the method.

After discharging of electrons from the cathode, a charging current can be applied to the cathode. Furthermore, the charging current can oxidizes $Li_xO_y$ to form molecular oxygen and released lithium cations.

The method can include, flowing the released lithium cations to the metallic lithium anode. Moreover, the method can include passing the released lithium cations through the separator positioned between the anode and cathode.

The current collector 102 can comprise an electrically conductive material. Moreover, the current collector 102 can allow air to pass through the current collector 102. The current collector generally comprises a metal screen, nickel foam, gas and diffusion carbon papers, stainless steel, copper, conductive graphite, nickel, silver, platinum, rhodium, iridium, gold, graphene, carbon black, carbon nanotubes, activated carbon, and a combination thereof.

The optional zero-valent, zero-charge metal commonly comprises one of titanium, zirconium, hafnium, vanadium, niobium, tantalum, chromium, molybdenum, tungsten, manganese, ruthenium, iron, osmium, cobalt, rhodium, iridium, nickel, palladium, platinum, copper, silver, gold, zinc, cadmium, mercury, aluminum, gallium, indium, thallium, lanthanum, cerium, praseodymium, neodymium, samarium, europium, gadolinium, terbium, dysprosium, holmium, erbium, thulium, ytterbium, lutetium and combinations thereof. More commonly, the optional zero-valent, zero-charge metal is selected from the group consisting of ruthenium, cobalt, rhodium, iridium, nickel, palladium, platinum, copper, silver, gold, and combinations thereof. Even more commonly, the optional zero-valent, zero-charge metal is silver, $Ag^0$.

The $M_xA_yO_z$ (103) can comprise an oxyanion of boron, aluminum, silicon, titanium, vanadium, chromium, manganese, gallium, germanium, zirconium, niobium, molybdenum, ruthenium, rhodium, indium, tin, antimony, tellurium, hafnium, tantalum, tungsten, rhenium, iridium, platinum, and bismuth. Generally, the second metal A can be selected from the group consisting of aluminum titanium, vanadium, chromium, manganese, gallium, germanium, zirconium, niobium, molybdenum, ruthenium, rhodium, indium, tungsten, rhenium, iridium, platinum and combinations thereof. More generally, the second metal A comprises an oxyanion of vanadium. The $A_yO_z$ of the $M_xA_yO_z$ (103) can be in the form of metal oxide.

The can comprise one or more of $M_xA_yO_z$, $A_yO_z$ and $A_yO_z^{n-}$, where n is a real positive number. The one or more of $M_xA_yO_z$, $A_yO_z$ and $A_yO_z^{n-}$ can be in one or both of oxidized and reduced forms, respectively. Moreover, the x values for the oxidized and reduced forms of the one or more of $M_xA_yO_z$, $A_yO_z$ and $A_yO_z^{n-}$ can differ. Similarly, they values for the oxidized and reduced forms of the one or more of $M_xA_yO_z$, $A_yO_z$ and $A_yO_z^{n-}$ can differ. Typically, the n value of reduced form of the oxyanion, $A_xO_y^{n-}$, is greater than the oxidized form of the $A_xO_y^{n-}$. More typically, the one or more of $M_xA_yO_z$, $A_yO_z$ and $A_yO_z^{n-}$ can contribute to the reduction of molecular oxygen, $O_2$, to at least one of $O^{2-}$, $O_2^-$, $O_2^{2-}$, $O_3^-$, and $O_3^{2-}$.

Furthermore, the $M_xA_yO_z$ (103) can contain two or more differing second metal A's. One of two or more differing second metal A's being a primary metal A and the other second metal A's being dopants. The dopants are typically one of chromium, manganese, gallium, germanium, zirconium, niobium, molybdenum, ruthenium, rhodium, indium, tungsten, rhenium, iridium, platinum and mixture thereof. Generally, the dopant can be selected from the group consisting of manganese, copper and combinations thereof.

The $M_xA_yO_z$ (103) generally comprises vanadium as the second metal and/or primary metal A with one or more dopants selected from the group consisting of chromium, manganese, gallium, germanium, zirconium, niobium, molybdenum, ruthenium, rhodium, indium, tungsten, rhenium, iridium, and platinum. Non-limiting examples of $M_xA_yO_z$ (103) containing one or more dopants are:

1) $Cu_{1-0.5x}Ag_xV_4O_yF_{2(11-y)}$, where $0 \le x \le 2$ and $10 \le y \le 11$, and Cu has a 2+ oxidation state.

2) For doping with 2+ oxidation state metal, $Ag_xM_yV_4O_{11}$, $0 \le x \le 2$, $0 \le y \le 1$.

3) For doping with 1+ oxidation state metal, $Ag_xM_yV_4O_{11}$, $0 \le x \le 2$, $0 \le y \le 2$.

4) For vanadium partial substitution or doping at vanadium site, it depends on dopant's oxidation state. If M is the dopant at vanadium site, $Ag_2V_xM_yO_{11}$, If M's oxidation state is a, then $y=5(4-x)/\alpha$, $3 \le x \le 4$.

If $\alpha=2$, $0 \le y \le 2.5$

If $\alpha=3$, $0 \le y \le 1.7$

If $\alpha=4$, $0 \le y \le 1.25$

If $\alpha=5$, $0 \le y \le 1$.

If $x=4$, then it is $Ag_2V_4O_{11}$.

5) Non-limiting examples for elements for doping at first metal site are boron, copper, cerium, europium, erbium, gold, gadolinium, holmium, iridium, lutetium, neodymium, osmium, platinum, palladium, ruthenium, rhodium, rhenium, samarium, terbium, and combinations thereof.

6) Non-limiting examples for dopants when vanadium is the primary second metal are aluminum, antimony, bismuth, chromium, cobalt, cadmium, dysprosium, hafnium, indium, iron, gallium, germanium, lanthanum, molybdenum, manganese, niobium, nickel, praseodymium, silicon, tin, tellurium, titanium, tantalum, tungsten, thallium, thulium, ytterbium, zirconium, zinc, and combinations thereof.

7) Non-limiting examples for doping at O site are fluorine, chlorine, bromine, iodine, and combinations thereof.

The polymeric binder 107 commonly comprises a homo-polymer or co-polymer. Furthermore, the polymeric binder 107 is usually a homo-polymer or co-polymer of a polyolefin, polystyrene, polyvinyl, polyacrylic, polyhalo-olefin, polydiene, polyoxide/esther/acetal, polysulfide, polyester/thioester, polyamide/thioamide, polyurethane/thiourethane, polyurea/thiourea, polyimide/thioimide, polyanhydride/thianhydride, polycarbonate/thiocarbonats, polyimine, polysiloxane/silane, polyphosphazene, polyketone/thioketone, polysulfone/sulfoxide/sulfonate/sulfoamide, polyphylene, and mixture thereof. The polymeric binder can be one or more of a the polymeric binder comprises one or more of a poly vinylidene fluoride homo-polymer, a poly vinylidene fluoride co-polymer, hexafluoropropylene, a poly vinylidene fluoride-co-hexafluoropropylene, poly(tetrafluoroethylene), styrene-butadiene rubber/sodium carboxyl methyl cellulose, a modified styrene-butadiene copolymer, and a modified styrene-butadiene aqueous copolymer.

The electrolyte solvent can be selected from the group consisting of dimethlsulfoxide, silanes, tri(ethylene glycol)-substituted trimethylsilane, ethylene carbonate, propylene carbonate, butylene carbonate, ethyl propyl carbonate, dimethyl carbonate, diethyl carbonate, ethyl methyl carbonate, N,N-diethylacetamide, γ-butyrolactone, dimethoxyethane, tetra(ethylene)glycol dimethyl ether, glycol ethers, and tetrahydrofuran and mixtures thereof. Further examples of the electrolyte solvent include room temperature ionic liquid electrolytes. Non-limiting examples of room temperature ionic liquid electrolytes containing cations selected from the group consisting essentially of imidazolium, pyridinium, pyrrolidinium, phosphonium, and ammonium, and anions such as $BF_4^-$, $PF_6^-$, $CF_3SO_3^-$, $N(CF_3SO_2)_2^-$, and $(C_4F_9)_3PF_3^-$. Further examples of solid-state electrolyte solvent include by way of example and without limitation LiSICON (lithium super-ionic conductor, NaSICON (sodium super-ionic conductor), polymer electrolytes [e.g. poly(ethylene oxide)], and gel-polymer electrolytes. Moreover, non-aqueous electrolyte solvents can an auxiliary organic solvent selected from the group consisting essentially of dimethyl sufoxide, ethylene carbonate, propylene carbonate, butylene carbonate, ethyl propyl carbonate, dimethyl carbonate, diethyl carbonate, ethyl methyl carbonate, N,N-diethylacetamide, γ-butyrolactone, dimethoxyethane, tetra(ethylene) glycol dimethyl ether, or glycol ethers, tetrahydrofuran, and mixtures thereof.

The electrolytic salt can comprises one of lithium perfluorinated alkyl sulfates, lithium perflourinated alkyl ether sulfates, lithium perfluorinated aryl sulfates, lithium perflourinated aryl ether sulfates, lithium perfluorinated alkyl-sulfonates, lithium trifluoromethan sulfonate, lithium perchlorate, lithium bis(oxalato)borate, lithium tetrachloroaluminate, lithium tetrafluoroborate, lithium alkylated borates, lithium $B(C_2H_5)_3C_6H_{13}$, lithium tosylate, lithium bis(perfluoro-alkylsulfonyl)amide, lithium bis(trifluoromethylsulfonyl)amide, lithium hexafluorophosphate, lithium hexafluoroarsenate, lithium bis(pentafluoro ethylsulfonyl)imide, Lithium tris(trifluoromethylsulfonyl)methide, lithium trifluoro tris(pentafluoroethyl)phosphate, lithium hexafluoroisopropoxide, lithium malonate borate, lithium difluoro(oxalato)borate, and mixtures thereof. Further non-limiting examples of lithium salt for non-aqueous electrolytes include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiCF_3SO_3$, $LiC_6F_5SO_3$, $LiO_2CCF_3$, $LiN(CF_3CF_2SO_2)_2$, $LiSO_6F$, $LiB(C_6H_5)_4$, $LiCF_3SO_3$, $LiB(C_2O_4)_2$, $LiOCH(CF_3)_2$, LiI, LiBr, and mixtures thereof.

The conductive carbonaceous material 106 typically comprises one of carbon black, activated carbon, graphene sheets, single-walled carbon nano-tubes, multi-walled carbon nanotubes, conductive graphite, carbon fibers and mixtures thereof. Commonly, the conductive carbonaceous material 106 has a surface area from about 25 to about 2,000 m²/g. Furthermore, the conductive carbonaceous material 106 generally has porosity from about 0.1 to about 10 m³/g.

The techniques of the present disclosure can incorporate ion-exchange metal oxides in composite oxygen cathodes that can metallize the cathode matrix in situ on a microscopic scale. The microscopically dispersed conductive metals can catalyze ORR and/or OER and enhance electronic conductivity and therefore improve cathode rate capability. While not wishing to be bound by any theory, the substantially uniformly dispersed metal oxides (e.g., SVO) in the composite cathodes are most likely electrocatalysts themselves towards ORR and/or OER. Incorporation of SVO in composite oxygen cathode and in situ metallizing the composite oxygen cathodes therefore is believed both to catalyze ORR and/or OER and enhance cathode electronic conductivity, thereby assisting oxygen cathode power performance.

These beneficial effects can be maximized when the ion-exchange metal oxide, e.g. SVO, is incorporated in a high surface area conductive carbon matrix, particularly in a carbon black matrix. The former can act both as a catalyst and as a conductive medium. The latter can provide a high surface area to maximize the beneficial effect.

Conductive metals can be in-situ dispersed, on a microscopic scale, in a metal/air (oxygen) cathode matrix and serve both as electrocatalysts for the oxygen reduction reaction (ORR) and/or oxygen evolution reaction (OER) and as electron conducting media. In-situ metallization is achieved via an ion-exchange process by which the metal oxides are incorporated in the composite cathode. For example, silver vanadium oxide ($Ag_2V_4O_{11}$, SVO) can be mixed with a high surface area conductive carbon black. A schematic representation of such ion exchange process is shown in FIG. 9 where silver ions are replaced by lithium ions and become metallic. Metallic silver particles then deposit, on a microscopic scale, in the cathode matrix and serve both as electrocatalysts for ORR and/or OER and as an electron conducting media for the composite cathode. The metal oxides can be substantially homogeneously dispersed in the composite cathode and can act as electrocatalysts themselves for ORR and/or OER. The inherent ability of SVO to accommodate up to seven lithium ions per formula (equivalent to 315 mAh/g) can contribute to the overall metal air cell capacity.

Any metal compounds can be used for in situ ion exchange, including metal oxides that ion-exchange with metal ions. Ion-exchange metal oxides should, however, be air stable, compatible with other battery components, e.g., electrolyte, wide electrochemical window, e.g. ≥5V vs. $Li/Li^+$, and chemically stable in a wide temperature range, e.g. from about −40° C. to about +60° C. The metals should also be highly conductive and exhibit effect catalytic function towards ORR and OER. Examples include lithium ions, such as, silver molybdenum oxide ($Ag_2MoO_4$) and silver chromate ($Ag_2CrO_4$), and metal substituted oxides, e.g., copper substituted SVO, may function similarly.

High surface area conductive carbons are preferentially employed. Examples include conductive carbon black. activated carbon, carbon nano-tubes, graphenes, or combinations or composites thereof. The composite oxygen cathodes formed by the synergistic incorporation of ion-exchange metal oxide in high surface conductive carbon black can be highly effective. Removal of either component from the other can lead to less efficient battery performance.

The range of weight percent of ion-exchange metal oxides in active composite cathode formulation typically ranges from about 10% to about 80% and more typically from about 25 to about 70.

The Li-air reaction mechanism can be in an aqueous or non-aqueous electrolyte. In non-aqueous Li/air batteries there are two principal electrode reactions of interest:

$$2Li + \tfrac{1}{2}O_2 \leftrightarrow Li_2O$$

$$2Li + O_2 \leftrightarrow Li_2O_2$$

The full reduction of $O_2$ to $Li_2O$ is desired because of its higher specific energy and energy density; however, it appears that $Li_2O_2$ is a product that forms more readily than $Li_2O$. In addition, when $Li_2O_2$ is formed full cleavage of the O—O bond may not be necessary, which can be important from a kinetic point of view.

In basic aqueous electrolytes, there are two principal electrode reactions of interest:

Reaction at positive (oxygen) electrode:
$$O_2 + 2H_2O + 4e^- \leftrightarrow 4OH^-$$

Reaction at negative (lithium) electrode:
$$Li \leftrightarrow Li^+ + e^-$$

Overall reaction: $2Li + \tfrac{1}{2}O_2 + H_2O \leftrightarrow 2LiOH$

In acidic aqueous electrolytes, there are two principal electrode reactions of interest:

Reaction mechanism with ammonium chloride: $2Li + \tfrac{1}{2}O_2 + 2NH_4Cl \leftrightarrow 2LiCl + 2NH_3 + H_2O$ Reaction mechanism with sulfuric acid: $2Li + \tfrac{1}{2}O_2 + H_2SO_4 \leftrightarrow Li_2SO_4 + H_2O$ Other alternative ion-exchange compounds include silver molybdenum oxide ($Ag_2MoO_4$) and silver chromate ($Ag_2CrO_4$) and metal substituted oxides, e.g., Cu, Mn, Co, Fe, and Ni substituted SVO.

As will be appreciated, metal ions can be a generic term for lithium ions. Examples of metal ions include sodium ions, magnesium ions, aluminum ions, zinc ions, copper ions.

In addition to the processes described above, the electrochemical energy device electrode 100 can modified by one of more of plating, chemical vapor deposition, or atomic layer deposition of the $M_xA_yO_z$ (103) on the current collector 102 or on electrode composite material 101. This would form a continuous or discontinuous outer layer 199 of the $M_xA_yO_z$ (103) on the exterior of the electrochemical energy device electrode 100. It can be appreciated that the electrode composite material can be one of the conductive material 106 substantially homogeneously dispersed in the polymeric binder 107 or the $M_xA_yO_z$(103) and conductive material 106 substantially homogeneously dispersed in the polymeric binder 107. Furthermore, the $M_xA_yO_z$ (103) layer can be directly deposited on the current collector 102. While the outer layer 199 can be thick film, the outer layer 199 would typically be a thin film having a thickness typically of no more than about 250 Å, more typically no more than about 175 Å, and even more typically no more than about 100 Å. Moreover, in some applications the out layer would commonly have a film thickness of no less than about 0.2 Å and nor more than about 100 Å.

EXAMPLES

Preparation of Electrode Composite Material

Silver vanadium oxide ($Ag_2V_4O_{11}$) and Super P conductive carbon black (Timcal) powders at about a 1:2 weight ratio were mixed and homogenized with polyvinyldiflouride and an organic solvent to form a paste. The paste was casted on stainless steel meshes.

Electrochemical Cell

A lithium/oxygen gas electrochemical cell was assembled. The electrochemical cell had anodic and cathodic compartments in electrical communication with a separator in positioned between the compartments. The anodic and cathodic compartments contained an electrolyte. The anodic compartment contained an anode. Furthermore, the cathodic compartment, in addition to containing a cathode breathed freely in an oxygen-containing gas environment to admit oxygen gas to the cathodic compartment. The electrolyte was 0.1M $LiClO_4$ in dimethylsulfoxide. Whatman glass fiber (934-AH) was used as separator.

Electrochemical Test Results

Figure 5A:
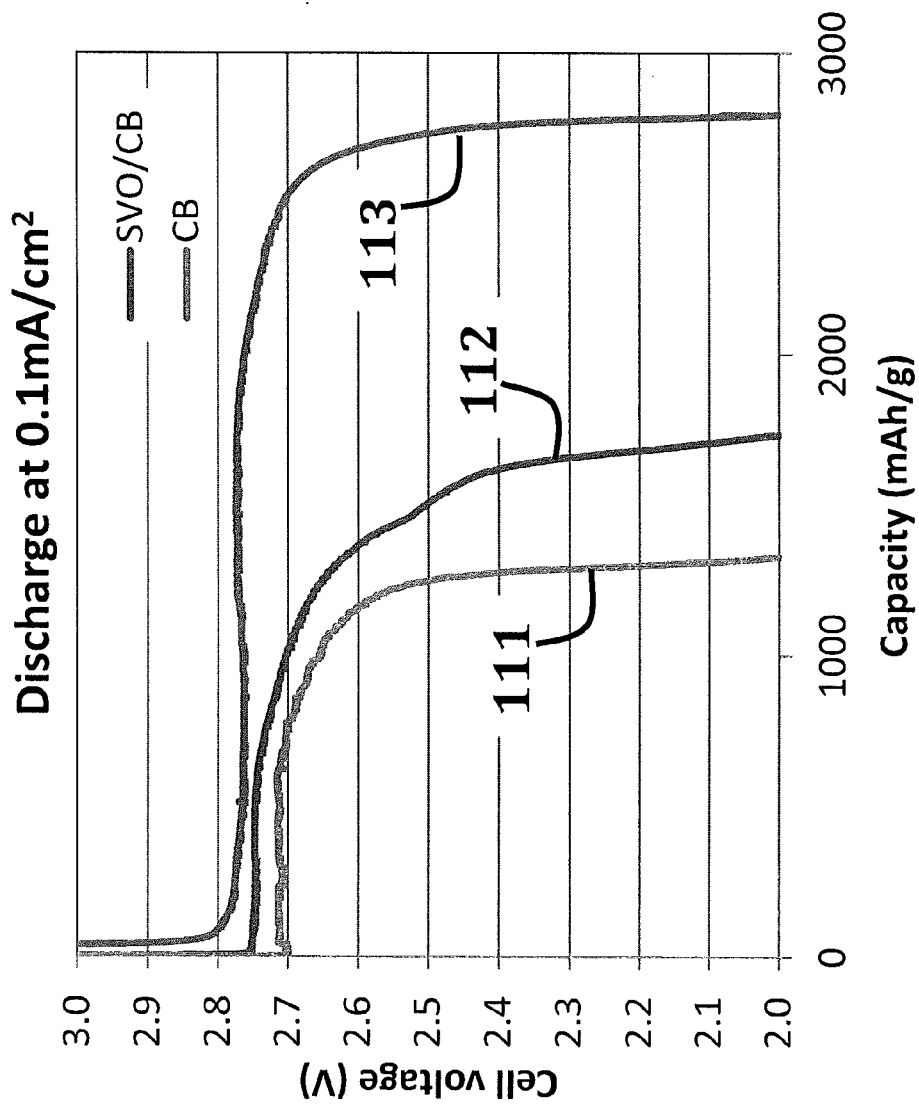
FIGS. 5A and 5B depict discharge and charge voltage profiles for a carbon black electrode and an electrode composite electrode according to this disclosure.
Figure 5B:
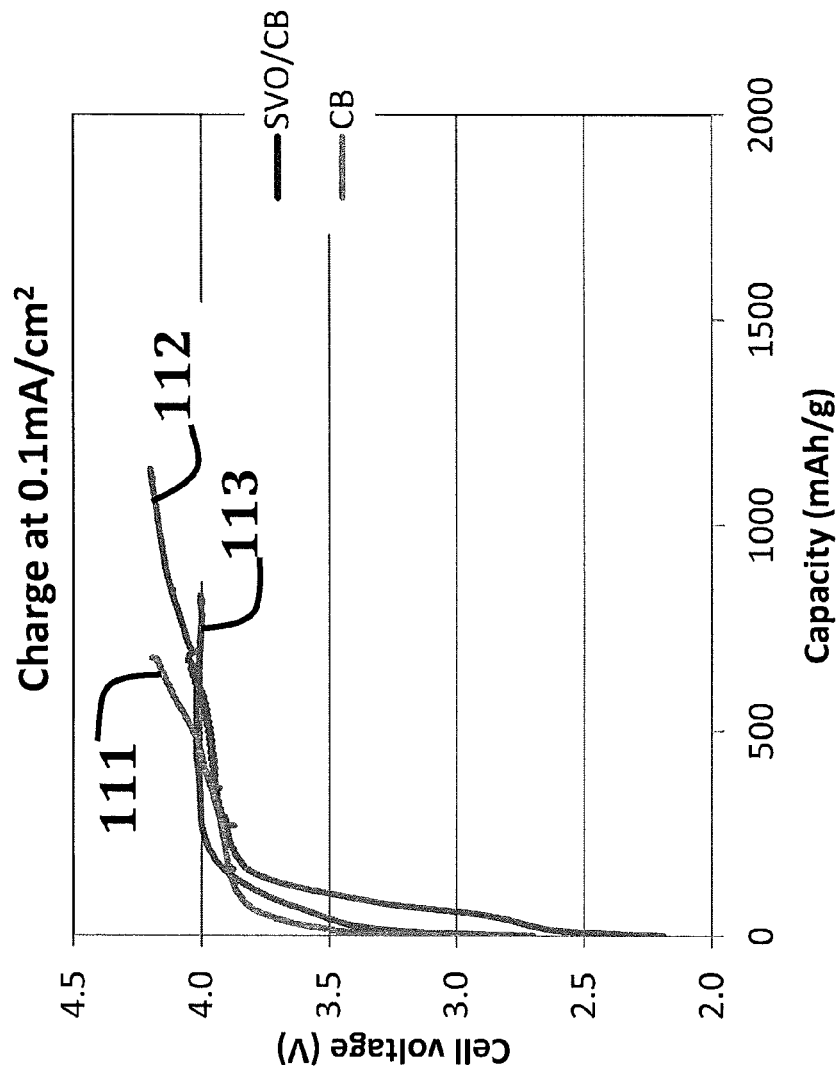

FIGS. 5A and 5B show a comparison of discharge (FIG. 5A) and charge (FIG. 5B) voltage profiles between a baseline electrode containing carbon black (scan lines 111) and results for the above electrode composite material 101 (scan lines 112 and 113). The electrochemical results are for oxygen cathodes cycled at 0.1 mA/cm² (corresponding to about 73 mA/g of total active materials).

The silver vanadium oxide/carbon black composite electrode cathode 101 (scan line 112) showed higher average first discharge potential of about 50 mV and higher discharge specific capacity of about 30%, compared with carbon black (scan lines 11)). After charging to a cutoff of about 4.2V, the second discharge of the silver vanadium oxide/carbon black composite electrode cathode 101 (scan lines 113) delivered a high capacity of about 2800 mAh/g based on total active materials and even lower discharge overpotential ($\eta_{dis}$) than carbon black electrode (scan lines 111) and initial scan of the silver vanadium oxide/carbon black composite electrode cathode (scan lines 112). The discharge plateau was substantially flat at a voltage of about 2.77V compared to about 2.6 to about 2.7V for carbon black or carbon-supported $\alpha$-$MnO_2$ cathodes at comparable rates.

Figure 6:
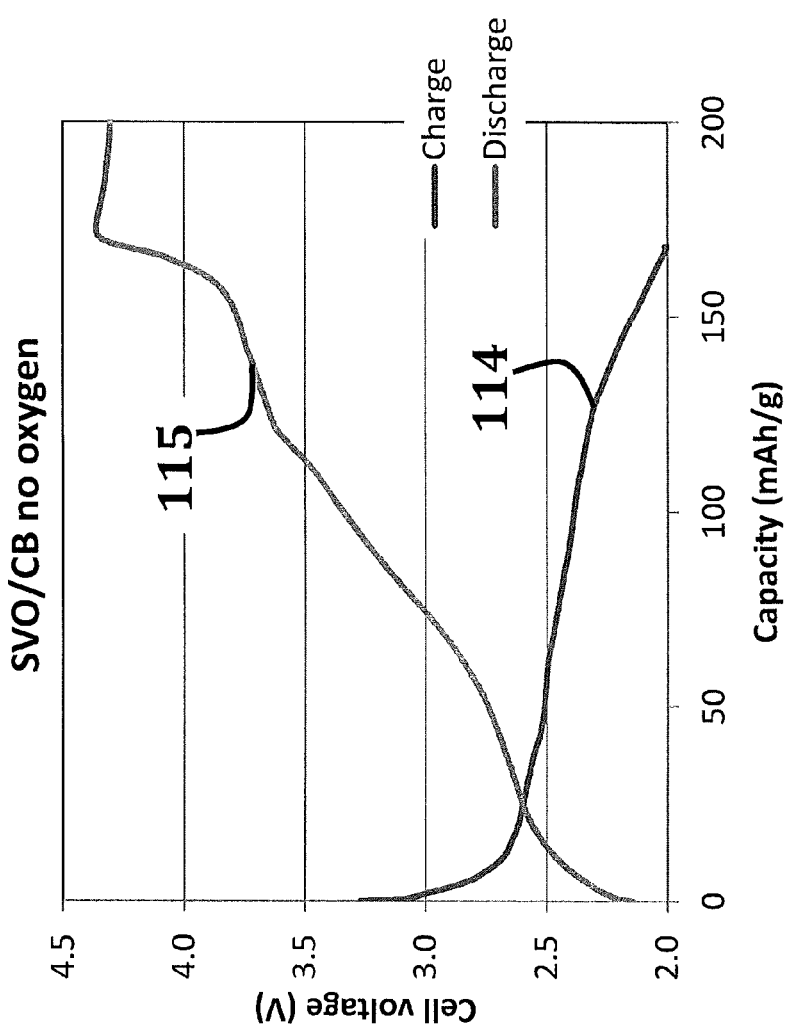
FIG. 6 depicts charge and discharge voltage profiles in a substantially oxygen free environment for an electrode composite electrode according to this disclosure.

The apparent drop in the $\eta_{dis}$ for the above electrode composite material is significant because $\eta_{dis}$ is typically not observed with other oxygen cathode materials such as $\alpha$-$MnO_2$. An electrochemical cell with lower $\eta_{dis}$ would be expected to have improved power density substantially greater than the lithium oxygen cathodes of the prior art. While not wanting to limited by theory, it is believed that the improved cathodic performance is an electro-catalytic effect due to the drop in $\eta_{dis}$ and/or electrolyte stability during cathodic discharge FIG. 6A, however, suggests that the above silver vanadium oxide/carbon black composite electrode is in fact participating in charge transfer at the end of the discharge reaction as evidenced by the additional capacity after about 2.52V that is characteristic of the above silver vanadium oxide/carbon black composite electrode 101 intercalation reaction voltage profiles for charging 114 and discharging 115 of composite electrode cathode 101 in a closed cell without oxygen (FIG. 6). While not wanting to be bound by theory, it is believed that $Li_2O_2$ may selectively form on the $Ag^0$ metal and/or a porous $Li_2O_2$ layer may be formed in the electrode composite material.

In order to separate the catalyst-like overpotential and capacity benefits of the above electrode composite material from the impact of $Li^+$ ion exchange in the metal oxide, an electrochemical cell was run under identical conditions to that of FIGS. 5A and 5B except under an argon atmosphere rather than an oxygen-containing atmosphere. FIG. 6 shows that the above electrode composite material delivered sloping charge 114 and discharge 115 profiles. The sloping charge 114 and discharge 115 profiles added about 170 mAh/g total to the electrochemical cell capacity on the first discharge (114). However, this added capacity for the cell ran in argon atmosphere faded sharply on subsequent cycles. It is believed that the capacity of the cell ran in the argon atmosphere faded quickly due to the lack of reversibility (charge/dis-charge capability, as previously discussed earlier). As such, the above electrode composite material provided about a 20% increase in discharge capacity on the first cycle beyond the capacity accounted for by the metal oxide ion exchange capacity.

On the second cycle, the gain in capacity for the above electrode composite material is about 115% along with an 80 mV drop in $\eta_{dis}$. These capacity gains come despite the fact that the above electrode composite material is believed to have a much lower surface area than the Super P base material.

Figure 7A:
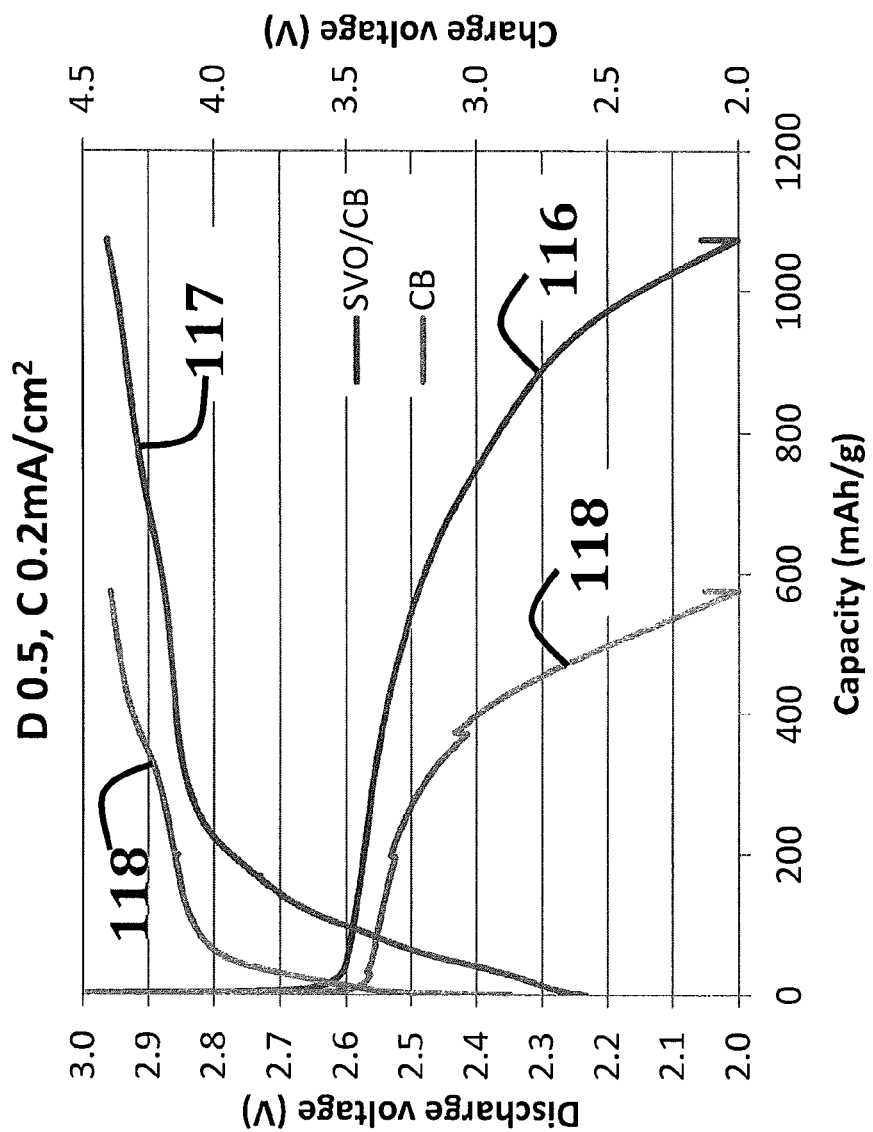
FIGS. 7A and 7B depict high rate discharge and recharge test for a carbon control electrode an electrode composite electrode according to this disclosure.

Higher rate tests were also performed (FIGS. 7A and 7B) at about 480 mA/g, 0.5 mA/cm² and 190 mA/g, 0.2 mA/cm² for discharge and charge, respectively, between a composite electrode 101 (scan lines 116 (discharge) and 117 (charge)) and a carbon black control (scan lines 118 (discharge) and 119 (charge)) cathodes. These higher rate tests were performed to expeditiously assess the above electrode composite material's 101 cycling ability and rate capability (scan lines 120 (first discharge), 121 (second discharge) and 123 (third discharge) and scan lines 123 (first charge), 124 (second charge) and 125 (third charge)). The results of these tests are show that at higher rates the above electrode composite material exhibits a drop in $\eta_{dis}$ of about 40 to about 50 mV. This drop in $\eta_{dis}$ is observed during the first low rate cycle. As expected, the lower $\eta_{dis}$ also resulted in an improved discharge rate capability for the above electrode composite material. The carbon black control cathode (scan lines 118 (discharge) and 119 (charge)) retained about 44% of its low rate capacity at 0.5 mA/cm$^2$ compared to 64% retention for the above electrode composite material 101 (scan lines 116 (discharge) and 117 (charge)).

Figure 7B:
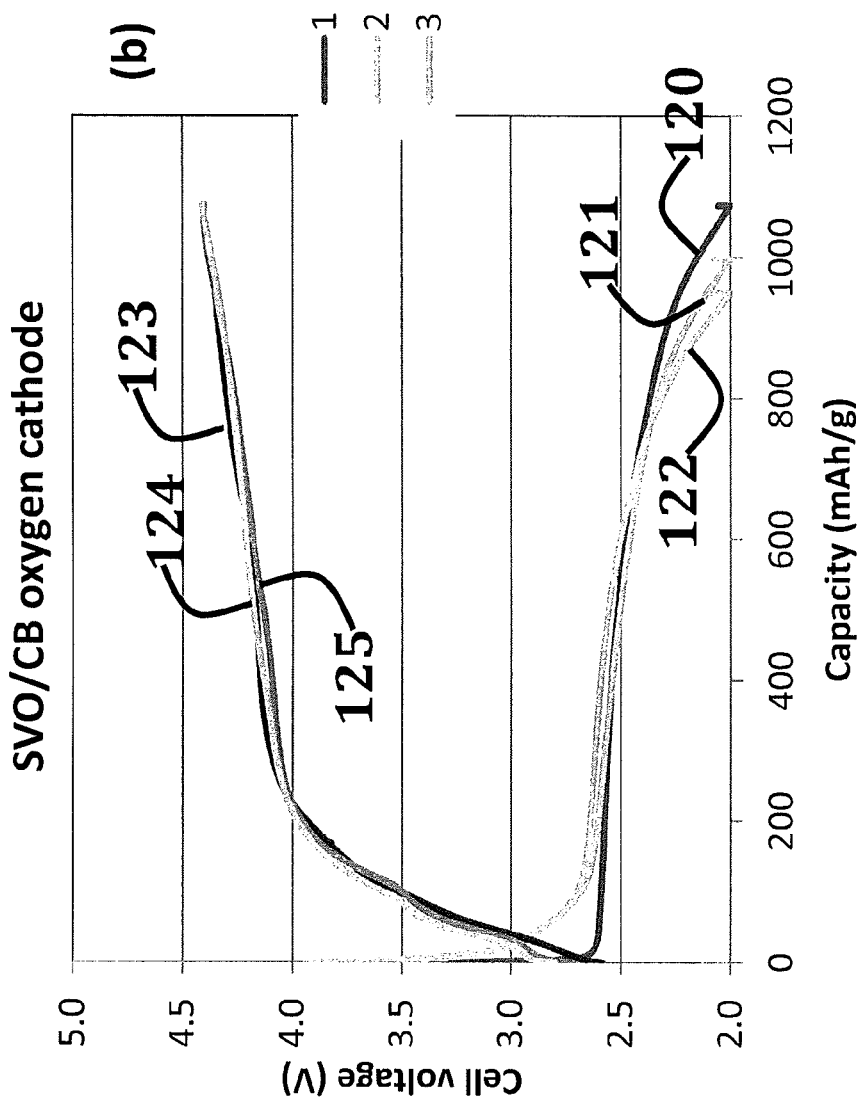

High rate tests were also preformed to evaluate ability to cycle the catholic electrode (scan lines 120-125). The high rate tests used a charge capacity cutoff equal to the discharge capacity of the above electrode composite material, thereby raising the cutoff voltage from about 4.2V to 4.4V. This cutoff is beyond the electrochemical stability of the silver vanadium oxide and may have led to some of the silver vanadium oxide and/or electrolyte breakdown. Furthermore, it is believed that the increased charge voltage could be due in part to the retention of the metal oxide characteristic charge profile beyond the first cycle (discharge scan line 120 and charge scan line 123) and lack of increase in catalytic activity between cycles one and two. Nonetheless, the above silver vanadium oxide/carbon black composite electrode was reversible, that is could be discharged and recharged multiple times, in this regime, as shown in FIG. 7B before capacity declined upon further discharge (scan lines 120-122)/recharge (scan lines 123-125) cycles. Post-mortem examination saw dry glass fiber separators which could reflect the instability over 4.2V or the crude cell design for this preliminary demonstration that did not include cathode or anode protection or hydrophobic layers.

A charge curve with a 4.2V cutoff exhibited a flat plateau at 4.0V. This plateau could be due to $O_2$ generation or to irreversible $CO_2$, as is often the case. Improvements in oxygen evolution reaction could be obtained through partial substitution of vanadium oxide/oxyanion with another transition metal. The other transition metal could be selected from the group consisting of Cu, Mn, Fe, Ni, or a mixture thereof.

These and other advantages will be apparent from the disclosure of the invention(s) contained herein.

A number of variations and modifications of the present disclosure can be used. It would be possible to provide for some features of the disclosure without providing others.

For example, other forms of metal compounds can be employed in the cathode materials. Examples include silver oxides, silver carbonates, silver chromates, silver molybdenum oxides, silver sulfides, silver selenates, silver tellurates, gold oxides, gold sulfides, gold selenides, gold tellurides, platinum oxides, platinum sulfides, and metal compounds that dissolve in electrolytes, e.g. silver bromate. While not wishing to be bound by any theory, it is possible that silver plays an insignificant role and the benefits come from the vanadium oxide component.

In yet another embodiment, the cathode materials discussed herein can be used in any batteries to enhance electronic and thermal conductivities. For example, the concepts of this disclosure can be used in a hybrid cathode where the ion exchange metal oxide potentially increases the rate performance, thermal conductivity, energy density, and/or design flexibility and reduces cost of the battery. Other types of batteries in which the cathode materials can be used include lithium-ion batteries (e.g. lithium-air batteries such as aprotic, aqueous, solid state, and mixed aqueous/aprotic), sodium-based batteries, redox flow batteries, and lead acid batteries.

The present disclosure, in various embodiments, configurations, or aspects, includes components, methods, processes, systems and/or apparatus substantially as depicted and described herein, including various embodiments, configurations, aspects, sub-combinations, and subsets thereof. Those of skill in the art will understand how to make and use the present disclosure after understanding the disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that, that being the claimed requires more features than are expressly recited in each claim. Rather, as the following claims reflect, patentable aspects lie in less than all features of a single foregoing disclosed embodiment, configuration, or aspect. Thus, the following claims are hereby incorporated into this Detailed Description, with each claim standing on its own as a separate preferred embodiment.

Moreover, though the description of the disclosure has included description of one or more embodiments, configurations, or aspects and certain variations and modifications, other variations, combinations, and modifications are within the scope of the present disclosure, e.g., as may be within the skill and knowledge of those in the art, after understanding the disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An electrode composite material for a metal/air electrochemical energy storage device, the electrode composite comprises $M_xA_yO_z$ for reducing molecular oxygen, wherein x, y, and z are real positive numbers, M is first metal, A comprises a second metal other than the first metal M and O is oxygen, wherein the second metal A comprises a primary second metal and one or more dopants, wherein the primary second metal comprises vanadium, and wherein the one or more dopants are selected from the group consisting of scandium, titanium, chromium, manganese, iron, cobalt, nickel and copper, wherein the electrode composition material has from about 1 to about 98 wt % $M_xA_yO_z$.

2. An electrode composite material for a metal/air electrochemical energy storage device, the electrode composite comprises $M_xA_yO_z$ for reducing molecular oxygen, wherein x, y, and z are real positive numbers, M is first metal, A comprises a second metal other than the first metal M and O is oxygen, wherein the second metal A comprises a primary second metal and one or more dopants, wherein the primary second metal comprises vanadium, wherein the one or more dopants are selected from the group consisting of scandium, titanium, chromium, manganese, iron, cobalt, nickel and copper, and wherein the first metal M further comprises a metal having an atomic number of one of 21-32, 39-42, 44-49, 64, 65, 74-81, or a combination thereof.

3. An electrode composite material for a metal/air electrochemical energy storage device, the electrode composite comprises $M_xA_yO_z$ for reducing molecular oxygen, wherein x, y, and z are real positive numbers, M is first metal, A comprises a second metal other than the first metal M and O is oxygen, wherein the second metal A comprises a primary second metal and one or more dopants, wherein the primary second metal comprises vanadium, wherein the one or more one dopants are selected from the group consisting of scandium, titanium, chromium, manganese, iron, cobalt, nickel and copper, and wherein the first metal M comprises a $M^+$ cation comprising one of ruthenium, cobalt, rhodium, boron, cerium, europium, erbium, gadolinium, holmium, lithium, lutetium, neodymium, osmium, rhenium, samarium, terbium, iridium, nickel, palladium, platinum, copper, silver, gold, and combinations thereof.

4. An electrode composite material for a metal/air electrochemical energy storage device, the electrode composite comprises $M_xA_yO_z$ for reducing molecular oxygen, wherein x, y, and z are real positive numbers, M is first metal, A comprises a second metal other than the first metal M and O is oxygen, wherein the second metal A comprises a primary second metal and one or more dopants, and wherein the primary second metal comprises vanadium, and wherein the one or more dopants are selected from the group consisting of scandium, titanium, chromium, manganese, iron, cobalt, nickel and copper, wherein the first metal comprise $Cu^{2+}$.

5. An electrode composite material for a metal/air electrochemical energy storage device, the electrode composite comprises $M_xA_yO_z$ for reducing molecular oxygen, wherein x, y, and z are real positive numbers, M is first metal, A comprises a second metal other than the first metal M and O is oxygen, wherein the second metal A comprises a primary second metal and one or more dopants, wherein the primary second metal comprises vanadium, and wherein the one or more one dopants are selected from the group consisting of aluminum, antimony, bismuth, chromium, cobalt, copper, cadmium, dysprosium, hafnium, indium, iron, gallium, germanium, lanthanum, molybdenum, manganese, niobium, nickel, praseodymium, rhenium, scandium, silicon, tin, tellurium, titanium, tantalum, tungsten, thallium, thulium, ytterbium, zirconium, zinc, and combinations thereof.

6. The electrode composite material of claim 1, wherein one or more of the following are true:
at least some of the oxygen in the $M_xA_yO_z$ is replaced with fluoride;
(ii) the electrode composition reduces the molecular oxygen to one or more of $O^{2-}$, $O_2^-$, $O_2^{2-}$, $O_3^-$, and $O_3^{2-}$;
(iii) the $M_xA_yO_z$ comprises particulates having an average primary particulate size ranging from about 1 to about 100 μm;
(iv) the $M_xA_yO_z$ has a shape generally resembling a cylindrical rod having a rod length from about 10 to about 200 nm and a rod diameter from about 10 to about 20 nm;
(v) the metal/air electrochemical energy storage device comprises a lithium/air battery; and
(vi) the $M_xA_yO_z$ comprises $Ag_2V_4O_{11}$.

7. The electrode composite material of claim 2, wherein one or more of the following are true:
the electrode composition reduces the molecular oxygen to one or more of $O^{2-}$, $O_2^-$, $O_2^{2-}$, $O_3^-$, and $O_3^{2-}$;
(ii) at least some of the oxygen in the $M_xA_yO_z$ is replaced with fluoride;
(iii) the $M_xA_yO_z$ comprises particulates having an average primary particulate size ranging from about 1 to about 100 μm;
(iv) the $M_xA_yO_z$ has a shape generally resembling a cylindrical rod having a rod length from about 10 to about 200 nm and a rod diameter from about 10 to about 20 nm;
(v) the metal/air electrochemical energy storage device comprises a lithium/air battery; and
(vi) the $M_xA_yO_z$ comprises $Ag_2V_4O_{11}$.

8. The electrode composite material of claim 4, wherein one or more of the following are true:
(i) the $M_xA_yO_z$ comprises particulates having an average primary particulate size ranging from about 1 to about 100 μm;
(ii) at least some of the oxygen in the $M_xA_yO_z$ is replaced with fluoride;
(iii) the electrode composition reduces the molecular oxygen to one or more of $O^{2-}$, $O_2^-$, $O_2^{2-}$, $O_3^-$, and $O_3^{2-}$;
(iv) the $M_xA_yO_z$ has a shape generally resembling a cylindrical rod having a rod length from about 10 to about 200 nm and a rod diameter from about 10 to about 20 nm;
(v) the metal/air electrochemical energy storage device comprises a lithium/air battery; and
(vi) the $M_xA_yO_z$ comprises $Ag_2V_4O_{11}$.

9. The electrode composite material of claim 5, wherein one or more of the following are true:
(i) the $M_xA_yO_z$ has a shape generally resembling a cylindrical rod having a rod length from about 10 to about 200 nm and a rod diameter from about 10 to about 20 nm;
(ii) at least some of the oxygen in the $M_xA_yO_z$ is replaced with fluoride;
(iii) the electrode composition reduces the molecular oxygen to one or more of $O^{2-}$, $O_2^-$, $O_2^{2-}$, $O_3^-$, and $O_3^{2-}$;
(iv) the $M_xA_yO_z$ comprises particulates having an average primary particulate size ranging from about 1 to about 100 μm;
(v) the metal/air electrochemical energy storage device comprises a lithium/air battery; and
(vi) the $M_xA_yO_z$ comprises $Ag_2V_4O_{11}$.

10. An electrode composite material for a metal/air electrochemical energy storage device, the electrode composite comprises $M_xA_yO_z$ for reducing molecular oxygen, wherein x, y, and z are real positive numbers, M is first metal, A comprises a second metal other than the first metal M and O is oxygen, wherein the second metal A comprises a primary second metal and one or more dopants, wherein the primary second metal comprises vanadium, wherein the one or more dopants are selected from the group consisting of scandium, titanium, chromium, manganese, iron, cobalt, nickel and copper, wherein the electrode composite material further comprises:
a conductive carbonaceous material; and
a polymeric binder, and
wherein the $M_xA_yO_z$ and the conductive carbonaceous material are homogeneously dispersed throughout the polymeric binder.

11. The electrode composite material of claim 10, wherein the conductive carbonaceous material comprises one of carbon black, activated carbon, graphene sheets, single-walled carbon nano-tubes, multi-walled carbon nanotubes, conductive graphite, carbon fibers and mixtures thereof, wherein the polymeric binder comprises one or more of a poly vinylidene fluoride homo-polymer, a poly vinylidene fluoride co-polymer, hexafluoropropylene, a poly vinylidene fluoride-co-hexafluoropropylene, poly (tetrafluoroethylene), styrene-butadiene rubber/sodium carboxyl methyl Cellulose, a modified styrene-butadiene copolymer, and a modified styrene-butadiene aqueous copolymer, wherein the polymeric binder containing the conductive carbonaceous material and the $M_xA_yO_z$ is in electrical contact with an electrolyte containing an electrolytic salt, and wherein the electrolyte comprises one of dimethlsulfoxide, silanes, tri(ethylene glycol)-substituted trimethylsilane, ethylene carbonate, propylene carbonate, butylene carbonate, ethyl propyl carbonate, dimethyl carbonate, diethyl carbonate, ethyl methyl carbonate, N,N-diethylacetamide, γ-butyrolactone, dimethoxyethane, tetra(ethylene) glycol dimethyl ether, glycol ethers, and tetrahydrofuran, and wherein the electrolytic salt comprises one of lithium perfluorinated alkyl sulfates, lithium perflorinated alkyl ether sulfates, lithium perfluorinated aryl sulfates, lithium perflorinated aryl ether sulfates, lithium perfluorinated alkylsulfonates, lithium trifluoromethan sulfonate, lithium perchlorate, lithium bis(oxalato)borate, lithium tetrachloroaluminate, lithium tetrafluoroborate, lithium alkylated borates, lithium $B(C_2H_5)_3C_6H_{13}$, lithium tosylate, lithium bis(perfluoroalkylsulfonyl) amide, lithium bis(trifluoromethylsulfonyl)amide, lithium hexafluorophosphate, lithium hexafluoroarsenate, lithium bis(pentafluoro ethyl sulfonyl)imide, Lithium tris(trifluoromethylsulfonyl)methide, lithium trifluoro tris(pentafluoroethyl) phosphate, lithium hexafluoroisopropoxide, lithium malonate borate, lithium difluoro(oxalato) borate, and mixtures thereof.

12. The electrode composite material of claim 10, wherein the conductive carbonaceous material has one or both of a surface area from about 25 to about 2,000 m²/g and a pore volume from about 0.1 to about 10 m³/g.

13. The electrode composite material of claim 3, wherein one or more of the following are true:
(i) the $M_xA_yO_z$ comprises $Ag_2V_4O_{11}$;
(ii) the electrode composition reduces the molecular oxygen to one or more of $O^{2-}$, $O_2^-$, $O_2^{2-}$, $O_3^-$, and $O_3^{2-}$;
(iii) the $M_xA_yO_z$ comprises particulates having an average primary particulate size ranging from about 1 to about 100 μm;
(iv) the $M_xA_yO_z$ has a shape generally resembling a cylindrical rod having a rod length from about 10 to about 200 nm and a rod diameter from about 10 to about 20 nm;
(v) the metal/air electrochemical energy storage device comprises a lithium/air battery; and
(vi) at least some of the oxygen in the $M_xA_yO_z$ is replaced with fluoride.

14. A method of using a metal/air electrochemical energy storage device electrode, comprising:
discharging electrons from an electrode comprising a current collector having an electrode composite material applied to one or more surfaces of the current collector, wherein the electrode composite material comprises a catalyst in the form of $M_xA_yO_z$ for reducing molecular oxygen, wherein x, y, and z are real positive numbers, M is first metal, A is metal other than M and O is oxygen; and reducing, with the $M_xA_yO_z$ catalyst and the discharging of the electrons from the electrode, at least some of the molecular oxygen.

15. The method of claim 14, wherein the catalytic reduction of molecular oxygen reduces the molecular oxygen to one or more of $O^{2-}$, $O_2^-$, $O_2^{2-}$, $O_3^-$, and $O_3^{2-}$.

16. The method of claim 14, wherein the metal/air electrochemical energy storage device electrode comprises a lithium-containing electrolytic salt and further comprising:
contacting the catalytically reduced molecular oxygen with the lithium of the lithium-containing electrolytic salt to form $Li_\alpha O_\beta$, where α and β are real, positive numbers.

17. The method of claim 16, wherein one of following is true:
the α has a value from about 1 to about 3 and the β has a value from about 1 to about 3; and
the α has a value of about 2 and the β has a value of about 1.

18. The method of claim 16, further comprising:
applying, after the discharging of the electrons, a charging current to the electrode and wherein the charging current oxidizes the $Li_xO_y$ to form molecular oxygen and lithium cations.

19. The method of claim 14, further comprising:
reducing, with the discharging of the electrons the electrode at least some, but not most, of the first metal to zero-valent, zero-charge metal particulates.

20. The method of claim 14, wherein the first metal M comprises one of ruthenium, cobalt, rhodium, iridium, nickel, palladium, platinum, copper, silver, gold, and combinations thereof, wherein A comprises vanadium and one or more of scandium, titanium, chromium, manganese, iron, cobalt, nickel and copper.

21. The method of claim 14, wherein A comprises vanadium.

22. The method of claim 14, wherein at least some of the oxygen in the $M_xA_yO_z$ is replaced with fluoride.

23. The method of claim 14, wherein the catalyst has a shaped generally resembling a cylindrical rod having a rod length from about 10 to about 200 nm and a rod diameter from about 10 to about 20 nm.

24. The method of claim 14, wherein the metal/air electrochemical energy storage device further comprises:
a conductive carbonaceous material;
a polymeric binder;
an electrolyte solvent; and
an electrolytic salt,
wherein the $M_xA_yO_z$ and conductive carbonaceous material are homogeneously dispersed throughout the polymeric binder.

25. The method of claim 14, wherein:
the conductive carbonaceous material comprises one of carbon black, activated carbon, graphene sheets, single-walled carbon nano-tubes, multi-walled carbon nano-tubes, conductive graphite, carbon fibers and mixtures thereof;
the polymeric binder comprises one or more of a poly vinylidene fluoride homo-polymer, a poly vinylidene fluoride co-polymer, hexafluoropropylene, a poly vinylidene fluoride-co-hexafluoropropylene, poly(tetrafluoroethylene), styrene-butadiene rubber/sodium carboxyl methyl Cellulose, a modified styrene-butadiene copolymer, and a modified styrene-butadiene aqueous copolymer;
the electrolyte comprises one or more of dimethlsulfoxide, silanes, tri(ethylene glycol)-substituted trimethylsilane, ethylene carbonate, propylene carbonate, butylene carbonate, ethyl propyl carbonate, dimethyl carbonate, diethyl carbonate, ethyl methyl carbonate, N,N-diethylacetamide, γ-butyrolactone, dimethoxyethane, tetra(ethylene) glycol dimethyl ether, glycol ethers, and tetrahydrofuran; and the electrolytic salt comprises one of lithium perfluorinated alkyl sulfates, lithium perflorinated alkyl ether sulfates, lithium perfluorinated aryl sulfates, lithium perflorinated aryl ether sulfates, lithium perfluorinated alkyl-sulfonates, lithium trifluoromethan sulfonate, lithium perchlorate, lithium bis(oxalato)borate, lithium tetrachloroaluminate, lithium tetrafluoroborate, lithium alkylated borates, lithium $B(C_2H_5)_3C_6H_{13}$, lithium tosylate, lithium bis(perfluoroalkylsulfonyl) amide, lithium bis(trifluoromethylsulfonyl)amide, lithium hexafluorophosphate, lithium hexafluoroarsenate, lithium bis(pentafluoro ethylsulfonyl)imide, Lithium tris(trifluoromethylsulfonyl)methide, lithium trifluoro tris(pentafluoroethyl) phosphate, lithium hexafluoroisopropoxide, lithium malonate borate, lithium difluoro(oxalato) borate, and mixtures thereof.

26. The method of claim 14, wherein $M_xA_yO_z$ comprise $Ag_2V_4O_{11}$.

27. A metal/air electrochemical energy storage device composite electrode, comprising $M_xA_yO_z$, wherein x, y, and z are real positive numbers, M is first metal, A comprises a second metal other than the first metal M and O is oxygen, wherein the second metal A comprises a primary second metal and one or more dopants, wherein the primary secondary metal comprises vanadium, and wherein the one or more dopants are selected from the group consisting of scandium, titanium, chromium, manganese, iron, cobalt, nickel and copper.

28. The composite electrode of claim 27, wherein one or more of the following are true:
  (i) the first metal M comprises a metal having an atomic number of one of 21-32, 39-42, 44-49, 64, 65, 74-81, or combinations thereof;
  (ii) the electrode composition material has from about 1 to about 98 wt % $M_xA_yO_z$;
  (iii) at least some of the oxygen in the $M_xA_yO_z$ is replaced with fluoride;
  (iv) the $M_xA_yO_z$ comprises particulates having an average primary particulate size ranging from about 1 to about 100 μm;
  (v) the $M_xA_yO_z$ has a shaped generally resembling a cylindrical rod having a rod length from about 10 to about 200 nm and a rod diameter from about 10 to about 20 nm;
  (vi) the metal/air electrochemical energy storage device comprises a lithium/air battery; and
  (vii) $M_xA_yO_z$ comprises $Ag_2V_4O_{11}$.

29. A metal/air electrochemical energy storage device composite electrode, comprising $M_xA_yO_z$, wherein x, y, and z are real positive numbers, M is first metal, A comprises a second metal other than the first metal M and O is oxygen, wherein the first metal comprise $Cu^{2+}$.

30. The composite electrode of claim 29, wherein one or more of the following are true:
  (i) the second metal A comprises an element selected from the group consisting of the elements contained in Groups 3-7, Groups 8-14 of the periodic table of elements and Re;
  (ii) the electrode composition material has from about 1 to about 98 wt % $M_xA_yO_z$;
  (iii) the second metal A is metal other than manganese;
  (iv) the second metal A comprises vanadium;
  (v) at least some of the oxygen in the $M_xA_yO_z$ is replaced with fluoride;
  (vi) the $M_xA_yO_z$ comprises particulates having an average primary particulate size ranging from about 1 to about 100 μm;
  (vii) the $M_xA_yO_z$ has a shaped generally resembling a cylindrical rod having a rod length from about 10 to about 200 nm and a rod diameter from about 10 to about 20 nm;
  (viii) the metal/air electrochemical energy storage device comprises a lithium/air battery; and
  (ix) $M_xA_yO_z$ comprises $Ag_2V_4O_{11}$.

31. A metal/air electrochemical energy storage device composite electrode, comprising $M_xA_yO_z$, wherein x, y, and z are real positive numbers, M is first metal, A comprises a second metal other than the first metal M and O is oxygen, further comprising:
  a conductive carbonaceous material; and
  a polymeric binder,
  wherein the $M_xA_yO_z$ and the conductive carbonaceous material are homogeneously dispersed throughout the polymeric binder.

32. The composite electrode of claim 31, wherein the conductive carbonaceous material comprises one of carbon black, activated carbon, graphene sheets, single-walled carbon nano-tubes, multi-walled carbon nanotubes, conductive graphite, carbon fibers and mixtures thereof,
  wherein the polymeric binder comprises one or more of a poly vinylidene fluoride homo-polymer, a poly vinylidene fluoride co-polymer, hexafluoropropylene, a poly vinylidene fluoride-co-hexafluoropropylene, poly (tetrafluoroethylene), styrene-butadiene rubber/sodium carboxyl methyl Cellulose, a modified styrene-butadiene copolymer, and a modified styrene-butadiene aqueous copolymer,
  wherein the polymeric binder containing the conductive carbonaceous material and the $M_xA_yO_z$ are in electrical contact with an electrolyte containing an electrolytic salt, and
  wherein the electrolyte comprises one of dimethlsulfoxide, silanes, tri(ethylene glycol)-substituted trimethylsilane, ethylene carbonate, propylene carbonate, butylene carbonate, ethyl propyl carbonate, dimethyl carbonate, diethyl carbonate, ethyl methyl carbonate, N,N-diethylacetamide, γ-butyrolactone, dimethoxyethane, tetra(ethylene) glycol dimethyl ether, glycol ethers, and tetrahydrofuran, and wherein the electrolytic salt comprises one of lithium perfluorinated alkyl sulfates, lithium perflorinated alkyl ether sulfates, lithium perfluorinated aryl sulfates, lithium perflorinated aryl ether sulfates, lithium perfluorinated alkyl-sulfonates, lithium trifluoromethan sulfonate, lithium perchlorate, lithium bis(oxalato)borate, lithium tetrachloroaluminate, lithium tetrafluoroborate, lithium alkylated borates, lithium $B(C_2H_5)_3C_6H_{13}$, lithium tosylate, lithium bis(perfluoroalkylsulfonyl) amide, lithium bis(trifluoromethylsulfonyl)amide, lithium hexafluorophosphate, lithium hexafluoroarsenate, lithium bis(pentafluoro ethyl sulfonyl)imide, Lithium tris(trifluoromethylsulfonyl)methide, lithium trifluoro tris(pentafluoroethyl) phosphate, lithium hexafluoroisopropoxide, lithium malonate borate, lithium difluoro(oxalato) borate, and mixtures thereof.

33. The composite electrode of claim 31, wherein the conductive carbonaceous material has one or both of a surface area from about 25 to about 2,000 m²/g and a pore volume from about 0.1 to about 10 m³/g.

* * * * *